(12) United States Patent
Svendsen

(10) Patent No.: US 8,285,595 B2
(45) Date of Patent: Oct. 9, 2012

(54) SYSTEM AND METHOD FOR REFINING MEDIA RECOMMENDATIONS

(75) Inventor: Hugh Svendsen, Chapel Hill, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 1144 days.

(21) Appl. No.: 11/392,054

(22) Filed: Mar. 29, 2006

(65) Prior Publication Data

US 2009/0076881 A1    Mar. 19, 2009

(51) Int. Cl.
  *G06Q 30/00* (2006.01)
  *G06F 7/00* (2006.01)
  *G06F 17/30* (2006.01)
(52) U.S. Cl. .................. 705/26.1; 707/674; 707/913
(58) Field of Classification Search ............... 707/104.1, 707/200
  See application file for complete search history.

(56) References Cited

U.S. PATENT DOCUMENTS

| | | |
|---|---|---|
| 4,870,579 A | 9/1989 | Hey |
| 5,616,876 A | 4/1997 | Cluts |
| 5,621,456 A | 4/1997 | Florin et al. |
| 5,754,939 A | 5/1998 | Herz et al. |
| 5,890,152 A | 3/1999 | Rapaport et al. |
| 5,918,223 A | 6/1999 | Blum et al. |
| 5,963,916 A | 10/1999 | Kaplan |
| 6,192,340 B1 | 2/2001 | Abecassis |
| 6,195,657 B1 | 2/2001 | Rucker et al. |
| 6,201,176 B1 | 3/2001 | Yourlo |
| 6,236,990 B1 | 5/2001 | Geller et al. |
| 6,266,649 B1 | 7/2001 | Linden et al. |
| 6,317,722 B1 | 11/2001 | Jacobi et al. |
| 6,353,823 B1 | 3/2002 | Kumar |
| 6,438,579 B1 * | 8/2002 | Hosken ..................... 709/203 |
| 6,498,955 B1 | 12/2002 | McCarthy et al. |
| 6,526,411 B1 | 2/2003 | Ward |
| 6,567,797 B1 | 5/2003 | Schuetze et al. |
| 6,615,208 B1 | 9/2003 | Behrens et al. |
| 6,629,104 B1 | 9/2003 | Parulski et al. |

(Continued)

FOREIGN PATENT DOCUMENTS

EP    1536352 A1    6/2005

(Continued)

OTHER PUBLICATIONS

Random House Unabridged Dictionary, 1997, Random House, http://dictionary.infoplease.com/refine (Accessed: Jul. 17, 2009).*

(Continued)

*Primary Examiner* — Jason Liao
(74) *Attorney, Agent, or Firm* — Withrow & Terranova, PLLC

(57) ABSTRACT

An archiving system is provided for archiving a user's media collection and refining recommendations made to the user by an e-commerce service, such as an e-commerce website, based on the archive of the user's media collection. In general, a central archiving system interacts with a user system to archive a user's media collection. Thereafter, while the user is interacting with the e-commerce service, a list of recommended media for the user is generated and provided to the archiving system. The archiving system refines the list based on the archive of the user's media collection. Optionally, the list of recommended media may be further refined based on a user profile and play history of the user. The refined list of recommended media is returned to the e-commerce service and presented to the user.

26 Claims, 10 Drawing Sheets

U.S. PATENT DOCUMENTS

| | | |
|---|---|---|
| 6,636,836 B1 | 10/2003 | Pyo |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,785,688 B2 | 8/2004 | Abajian et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,933,433 B1 | 8/2005 | Porteus et al. |
| 6,937,730 B1 | 8/2005 | Buxton |
| 6,941,275 B1 | 9/2005 | Swierczek |
| 6,941,324 B2 | 9/2005 | Plastina et al. |
| 6,947,922 B1 | 9/2005 | Glance |
| 6,990,453 B2 | 1/2006 | Wang et al. |
| 7,000,188 B1 | 2/2006 | Eustace |
| 7,013,301 B2 | 3/2006 | Holm et al. |
| 7,028,082 B1 | 4/2006 | Rosenberg et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,177,872 B2 | 2/2007 | Schwesig et al. |
| 7,200,852 B1 | 4/2007 | Block |
| 7,222,187 B2 | 5/2007 | Yeager et al. |
| 7,233,948 B1 | 6/2007 | Shamoon et al. |
| 7,283,992 B2 * | 10/2007 | Liu et al. ............................ 707/3 |
| 7,296,285 B1 | 11/2007 | Jun et al. |
| 7,321,923 B1 | 1/2008 | Rosenberg et al. |
| 7,360,160 B2 | 4/2008 | Matz |
| 7,496,623 B2 | 2/2009 | Szeto et al. |
| 7,504,576 B2 | 3/2009 | Georges |
| 7,580,932 B2 | 8/2009 | Plastina et al. |
| 7,614,006 B2 | 11/2009 | Molander |
| 7,720,871 B2 | 5/2010 | Rogers et al. |
| 2001/0013009 A1 | 8/2001 | Greening et al. |
| 2001/0021914 A1 | 9/2001 | Jacobi et al. |
| 2002/0002483 A1 | 1/2002 | Siegel et al. |
| 2002/0002899 A1 | 1/2002 | Gjerdingen et al. |
| 2002/0019858 A1 | 2/2002 | Kaiser et al. |
| 2002/0037083 A1 | 3/2002 | Weare et al. |
| 2002/0052207 A1 | 5/2002 | Hunzinger |
| 2002/0052873 A1 | 5/2002 | Delgado et al. |
| 2002/0082901 A1 * | 6/2002 | Dunning et al. ................ 705/10 |
| 2002/0087565 A1 | 7/2002 | Hoekman et al. |
| 2002/0099697 A1 | 7/2002 | Jensen-Grey |
| 2002/0103796 A1 | 8/2002 | Hartley |
| 2002/0138630 A1 | 9/2002 | Solomon et al. |
| 2002/0138836 A1 | 9/2002 | Zimmerman |
| 2002/0157096 A1 | 10/2002 | Hane et al. |
| 2002/0165793 A1 | 11/2002 | Brand et al. |
| 2002/0178057 A1 | 11/2002 | Bertram et al. |
| 2002/0199194 A1 | 12/2002 | Ali |
| 2003/0014407 A1 * | 1/2003 | Blatter et al. ..................... 707/6 |
| 2003/0033347 A1 | 2/2003 | Bolle et al. |
| 2003/0045953 A1 | 3/2003 | Weare |
| 2003/0045954 A1 | 3/2003 | Weare et al. |
| 2003/0055516 A1 | 3/2003 | Gang et al. |
| 2003/0055657 A1 * | 3/2003 | Yoshida et al. ............... 704/500 |
| 2003/0066068 A1 | 4/2003 | Gutta et al. |
| 2003/0089218 A1 | 5/2003 | Gang et al. |
| 2003/0110503 A1 | 6/2003 | Perkes |
| 2003/0115167 A1 | 6/2003 | Sharif et al. |
| 2003/0135513 A1 | 7/2003 | Quinn et al. |
| 2003/0149612 A1 | 8/2003 | Berghofer et al. |
| 2003/0160770 A1 | 8/2003 | Zimmerman |
| 2003/0191753 A1 | 10/2003 | Hoch |
| 2003/0217055 A1 | 11/2003 | Lee et al. |
| 2003/0229537 A1 | 12/2003 | Dunning et al. |
| 2003/0233241 A1 | 12/2003 | Marsh |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019608 A1 | 1/2004 | Obrador |
| 2004/0034441 A1 | 2/2004 | Eaton et al. |
| 2004/0078383 A1 | 4/2004 | Mercer |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0139059 A1 | 7/2004 | Conroy et al. |
| 2004/0158870 A1 | 8/2004 | Paxton et al. |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0267604 A1 | 12/2004 | Gross |
| 2005/0021420 A1 | 1/2005 | Michelitsch et al. |
| 2005/0021678 A1 | 1/2005 | Simyon et al. |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071221 A1 | 3/2005 | Selby |
| 2005/0076056 A1 | 4/2005 | Paalasmaa et al. |
| 2005/0108233 A1 | 5/2005 | Metsatahti et al. |
| 2005/0120053 A1 * | 6/2005 | Watson ...................... 707/104.1 |
| 2005/0125222 A1 | 6/2005 | Brown et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0177516 A1 | 8/2005 | Vandewater et al. |
| 2005/0177568 A1 | 8/2005 | Diamond et al. |
| 2005/0187943 A1 | 8/2005 | Finke-Anlauff et al. |
| 2005/0192987 A1 | 9/2005 | Marsh |
| 2005/0197961 A1 | 9/2005 | Miller et al. |
| 2005/0234995 A1 | 10/2005 | Plastina et al. |
| 2005/0240661 A1 | 10/2005 | Heller et al. |
| 2005/0246391 A1 | 11/2005 | Gross |
| 2005/0246740 A1 | 11/2005 | Teraci |
| 2005/0251455 A1 | 11/2005 | Boesen |
| 2005/0251807 A1 | 11/2005 | Weel |
| 2005/0256756 A1 | 11/2005 | Lam et al. |
| 2005/0267944 A1 | 12/2005 | Little, II |
| 2005/0278364 A1 | 12/2005 | Kamen |
| 2005/0278758 A1 | 12/2005 | Bodlaender |
| 2005/0283791 A1 | 12/2005 | McCarthy et al. |
| 2005/0286546 A1 | 12/2005 | Bassoli et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0020662 A1 | 1/2006 | Robinson |
| 2006/0020962 A1 | 1/2006 | Stark et al. |
| 2006/0026048 A1 | 2/2006 | Kolawa et al. |
| 2006/0032363 A1 | 2/2006 | Platt |
| 2006/0048059 A1 | 3/2006 | Etkin |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0117260 A1 | 6/2006 | Sloo et al. |
| 2006/0126135 A1 | 6/2006 | Stevens et al. |
| 2006/0129544 A1 | 6/2006 | Yoon et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0195479 A1 | 8/2006 | Spiegelman et al. |
| 2006/0195512 A1 | 8/2006 | Rogers et al. |
| 2006/0195514 A1 * | 8/2006 | Rogers et al. ................. 709/203 |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |

| | | | |
|---|---|---|---|
| 2006/0195790 | A1 | 8/2006 | Beaupre et al. |
| 2006/0200435 | A1 | 9/2006 | Flinn et al. |
| 2006/0218187 | A1 | 9/2006 | Plastina et al. |
| 2006/0224435 | A1 | 10/2006 | Male et al. |
| 2006/0227673 | A1 | 10/2006 | Yamashita et al. |
| 2006/0230065 | A1 | 10/2006 | Plastina et al. |
| 2006/0241901 | A1 | 10/2006 | Hanus et al. |
| 2006/0242178 | A1 | 10/2006 | Butterfield et al. |
| 2006/0253417 | A1 | 11/2006 | Brownrigg et al. |
| 2006/0254409 | A1 | 11/2006 | Withop |
| 2006/0259355 | A1 | 11/2006 | Farouki et al. |
| 2006/0265409 | A1 | 11/2006 | Neumann et al. |
| 2006/0271959 | A1 | 11/2006 | Jacoby et al. |
| 2006/0271961 | A1 | 11/2006 | Jacoby et al. |
| 2006/0277098 | A1* | 12/2006 | Chung et al. ............... 705/14 |
| 2006/0282856 | A1 | 12/2006 | Errico et al. |
| 2006/0288041 | A1 | 12/2006 | Plastina et al. |
| 2006/0288074 | A1 | 12/2006 | Rosenberg |
| 2006/0293909 | A1 | 12/2006 | Miyajima et al. |
| 2007/0005793 | A1 | 1/2007 | Miyoshi et al. |
| 2007/0011095 | A1 | 1/2007 | Vilcauskas et al. |
| 2007/0022437 | A1 | 1/2007 | Gerken |
| 2007/0033419 | A1 | 2/2007 | Kocher et al. |
| 2007/0043766 | A1 | 2/2007 | Nicholas et al. |
| 2007/0044010 | A1 | 2/2007 | Sull et al. |
| 2007/0053268 | A1 | 3/2007 | Crandall et al. |
| 2007/0078714 | A1 | 4/2007 | Ott, IV et al. |
| 2007/0078832 | A1 | 4/2007 | Ott, IV et al. |
| 2007/0078895 | A1 | 4/2007 | Hsieh et al. |
| 2007/0079352 | A1 | 4/2007 | Klein |
| 2007/0083471 | A1 | 4/2007 | Robbin et al. |
| 2007/0094215 | A1 | 4/2007 | Toms et al. |
| 2007/0100904 | A1 | 5/2007 | Casey et al. |
| 2007/0106672 | A1 | 5/2007 | Sighart et al. |
| 2007/0106693 | A1 | 5/2007 | Houh et al. |
| 2007/0118657 | A1 | 5/2007 | Kreitzer et al. |
| 2007/0118802 | A1 | 5/2007 | Gerace et al. |
| 2007/0118853 | A1 | 5/2007 | Kreitzer et al. |
| 2007/0124325 | A1 | 5/2007 | Moore et al. |
| 2007/0162502 | A1* | 7/2007 | Thomas et al. ............ 707/104.1 |
| 2007/0214182 | A1 | 9/2007 | Rosenberg |
| 2007/0220100 | A1 | 9/2007 | Rosenberg |
| 2007/0244880 | A1 | 10/2007 | Martin et al. |
| 2007/0265870 | A1 | 11/2007 | Song et al. |
| 2007/0266049 | A1 | 11/2007 | Cohen et al. |
| 2007/0288546 | A1 | 12/2007 | Rosenberg |
| 2008/0010372 | A1 | 1/2008 | Khedouri et al. |
| 2008/0016205 | A1 | 1/2008 | Svendsen |
| 2008/0032723 | A1 | 2/2008 | Rosenberg |
| 2008/0052371 | A1 | 2/2008 | Partovi et al. |
| 2008/0091771 | A1 | 4/2008 | Allen et al. |
| 2008/0140717 | A1 | 6/2008 | Rosenberg et al. |
| 2008/0189295 | A1 | 8/2008 | Khedouri et al. |
| 2008/0208823 | A1 | 8/2008 | Hicken |
| 2008/0270561 | A1 | 10/2008 | Tang et al. |
| 2009/0129671 | A1 | 5/2009 | Hu et al. |
| 2010/0005116 | A1 | 1/2010 | Yoon et al. |
| 2010/0063975 | A1 | 3/2010 | Hayes |

FOREIGN PATENT DOCUMENTS

| | | |
|---|---|---|
| EP | 1791130 A2 | 5/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/038666 A1 | 4/2005 |
| WO | 2005/071571 A1 | 8/2005 |
| WO | 2006/1263135 A2 | 11/2006 |

OTHER PUBLICATIONS

Dictionary.com, "sale," in Dictionary.com Unabridged; in The American Heritage® Dictionary of the English Language, Fourth Edition. Source locations: Random House, Inc. http://dictionary.reference.com/browse/sale. Houghton Mifflin Company, 2004. http://dictionary.reference.com/browse/sale. Available: http://dictionary.reference.com. Accessed: Febru.*

Macosxhints.com, "How many songs are in your iTunes Music library (or libraries in total, if you use more than one)?" Source location: Max OS X Hints http://www.macosxhints.com/polls/index.php?pid=itunesmusiccount. Accessed: Feb. 24, 2010.*

MusicBanter.com, "How many songs are there in your media library?" Source location: Music Banter, http://www.musicbanter.com/general-music/47403-what-size-your-physical-digital-music-collection-12.html. Available: http://www.musicbanter.com. Accessed: Feb. 24, 2010.*

Apple.com, "Identifying iPod models". Source location: Apple, Inc. http://support.apple.com/kb/HT1353. Available: support.apple.com. Accessed: Feb. 24, 2010.*

Mitchell, "Cable Speed —How Fast Is Cable Modem Internet?" Source location: About.com, http://compnetworking.about.com/od/internetaccessbestuses/f/cablespeed.htm. Available: computernetworking.about.com. Accessed Feb. 24, 2010.*

Google.com, "18 gigabytes to kilobit—Google Search". Source location: Google Inc., http://www.google.com/#hl=en&source=hp&q=Google+inc&aq=f&aqi=g10&aql=&oq=&fp=c26c79a56c95bda8, Available: www.google.com. Accessed: Feb. 24, 2010.*

Google.com, "150944944 / 768 / 60 / 60—Google Search". Source location: Google Inc., http://www.google.com/#hl=en&q=150944944+%2F+768+%2F+60+%2F+60&aq=f&aqi=h1&aql=& oq=&fp=c26c79a56c95bda8, Available: www.google.com. Accessed: Feb. 24, 2010.*

Abstract, Chinese Patent Publication No. 1383328A, published Dec. 4, 2002, "Method and System for Recommending Program," Chinese Patent Applicaton No. 20021018177, filed Apr. 23, 2002, Applicant: NEC CORP, Inventors: Hidegi Hane and Shinichiro Kamei, obtained from http://www.espacenet.com, as the abstract to related US Patent Application Publication No. 2002/01570961 A1, 2 pages.

Abstract, Chinese Patent Publication No. 1841385A, published Oct. 4, 2006, "Method of supplying content data and playlist thereof," Chinese Patent Application No. 20061073372, filed Mar. 31, 206, Applicant: SONY CORP, Inventor: Takeh Miyajima Yasushi Yamashi, obtained from http://www.espacenet.com, 1 page.

Abstract, Japanese Patent Publication No. 2005-321668, published Nov. 17, 2005, "Device and method for processing information, and program," Japanese Patent Application No. 2004-140602, filed May 11, 2004, Applicant: SONY CORP, Inventor: Kobayashi Yoshiyuki, obtained from the Patent Abstracts of Japan (PAJ), 1 page.

Abstract, Reddy S. and Mascia, J., "Lifetrak: music in tune with your life," Proceesings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.

Hill et al., "Redcommending and Evaluating Choices in a Virtual Community of Use," <http://delivery.acm.org/10.1145/230000/223929/p1. . .1=GUIDE&dl=GUIDE&CFID=101371626&CFTOKEN=47493911<, Proceedings of CHI 1995, May 7-11, 1995, Denver, Colorado, printed Sep. 10, 2010, 15 pages.

Holzner, Steven, overview of book "Inside JavaScript," published Aug. 28, 2002, New Riders, website copyright 2009, Safari Books Online, 7 pages.

Kristen Nicole, "YouTube Remixer—Online Video Editing for YouTube," at <http://mashable.com/2007/06/16/youtube-remixer/>dated Jun. 16, 2007, including a post that appears to be posted 2 years prior to Jun. 16, 2007 (Jun. 2005), printed Jan. 8, 2010, 4 pages.

"MyStrands Labs: Patent-pending Technologies," at <http://labs.mystrands.com/patents.html, printed Feb. 7, 2007, 5 pages.

Pouwelse et al., "P2P-based PVR Recommendation using Friends, Taste Buddies and Superpeers," Workshop: Beyond Personalization 2005, IUI 2005, Jan. 9, 2005, San Diego, California, 6 pages.

Xiong, Li and Liu, Ling, "PeerTrust: Supporting Reputation-Based Trust for Peer-to-Peer Electronic Communities," IEEE Transactions on Knowledge and Data Engineering, vol. 16, No. 7, Jul. 2004, copyright 2004, IEEE, 15 pages.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"YouTube—Broadcast Yourself.," http://www.youtube.com/, copyright 2007 YouTube, LLC, printed Oct. 26, 2007, 2 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Outlook Home Page—Microsoft Office Online," http://office.microsoft.com/en-us/outlook/default.aspx, copyright 2007 Microsoft Corporation, printed Nov. 8, 2007, 1 page.

"Thunderbird—Reclaim your inbox," http://www.mozilla.com/en-US/thunderbird/, copyright 2005-2007 Mozilla, printed Nov. 8, 2007, 2 pages.

"RYM FAQ—Rate Your Music," http://rateyourmusic.com/faq/, copyright 2000-2007 rateyourmusic.com, printed Nov. 8, 2007, 14 pages.

"Trillian (software)—Wikipedia, the free encyclopedia," http://en.wikipedia.org/wiki/Trillian_(instant_messenger), printed Nov. 8, 2007, 11 pages.

"Not safe for work—Wikipedia, the free encyclopedia," http://en.wikipedia.org/wiki/Work_safe, printed Nov. 8, 2007, 2 pages.

"Zune.net—How-To—Share Audio Files Zune to Zune," http://web.archive.org/web/20070819121705/http://www.zune.net/en-us/support/howto/z..., copyright 2007 Microsoft Corporation, printed Nov. 14, 2007, 2 pages.

"LAUNCHcast Radio—Yahoo! Messenger," http://messenger.yahoo.com/launch.php, copyright 2007 Yahoo! Inc., printed Nov. 8, 2007, 1 page.

"Amazon.com: Online Shopping for Electronics, Apparel, Computers, Books, DVDs & m . . .," http://www.amazon.com/, copyright 1996-2007 Amazon.com, Inc., printed Oct. 26, 2007, 4 pages.

"Appl—IPod classic," http://www.apple.com/ipodclassic/, printed Oct. 26, 2007, 1 page.

"betterPropaganda—Free MP3s and music videos," http://www.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

"The Classic TV Database—Your Home For Classic TV!—www.classic-tv.com," http://www.classic-tv.com, copyright The Classic TV Database—www.classic.tv.com, printed Feb. 7, 2007, 3 pages.

"Digital Tech Life>>Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/2006081300442/http://genielab.com/, copyright 2005 GenieLab, LLC, printed Oct. 26, 2007, 1 page.

"The Daily Barometer—GenieLab.com grants music lovers' wishes," http://media.barometer.orst.edu/home/index.cfm?event32 display/ArticlePrinterFriendly&uSt..., copyright 2007 The Daily Barometer, printed Feb. 16, 2007, 2 pages.

"Gracenote Playlist," Revised Dec. 29, 2005, 2 pages.

"Gracenote Playlist Plus," Revised Dec. 29, 2005, 2 pages.

"Gracenote," http://www.gracenote.com, printed Feb. 7, 2007, 1 page.

"IEEE 802.11—Wikipedia, the free encyclopedia," http://en.wikipedia.org/wiki/IEEE_802.11, printed Oct. 26, 2007, 5 pages.

"iLikeTM—Home," http://www.ilike.com/, copyright 2007 iLike, printed May 17, 2 pages.

"The Internet Movie Database (IMDb)," http://www.imdb.com/, copyright 1990-2007 Internet Movie Database Inc., printed Feb. 7, 2007, 3 pages.

"Apple—iPod + iTunes," http://www.apple.com/tunes/, copyright 2007 Paramount Pictures, printed Feb. 7, 2007, 2 pages.

"Last.fm—Wikipedia, the free encyclopedia," http://en.wikipedia.org/wiki/Last.fm, printed Aug. 8, 2006, 7 pages.

"LimeWire—Wikipedia, the free encyclopedia," http://en.wikipedia.org/wiki/LimeWire, printed Aug. 8, 2006, 2 pages.

"liveplasma music, movies, search engine and discovery engine," http://www.liveplasma.com, printed May 17, 2007, 1 page.

"Loomia—Personalized Recommendations for Media, Content and Retail Sites," http://www.loomia.com/, copyright 2006-2007 Loomia Inc., printed Feb. 7, 2007, 2 pages.

"Mercora—Music Search and Internet Radio Network," http://www.mercora.com/overview.asp, copyright 2004-2006 Mercora, Inc., printed Aug. 8, 2006, 1 page.

"Mercora—Music Search and Internet Radio Network," http://www.mercora.com/v6/_front/web.jsp, printed Feb. 7, 2007, 1 page.

"Welcome to the MUSICMATCH Guide," http://www.mmguide.musicmatch.com/, copyright 2001-2004 Musicmatch, Inc., printed Feb. 7, 2007, 1 page.

"Mongomusic.com—The Best Download mp3 Resources and Information. This website is for sale!," http://www.mongomusic.com/, printed May 17, 2007, 2 pages.

"Take a look at the Future of Mobile Music :: MUSIC GURU," http://www.symbian-freak.com/news/006/02/music_guru.htm, copyright 2005 Symbian freak, printed Feb. 7, 2007, 3 pages.

"Music Recommendations 1.0—MacUpdate," http://www.macupdate.com/info.php/id/19575, printed Feb. 16, 2007, 1 page.

"MusicGremlin," http://www.musicgremlin.com/StaticContent.aspx?id=3, copyright 2005, 2006, 2007 MusicGremlin, Inc., printed Oct. 26, 2007, 1 page.

"MusicIP—The Music Search Engine," http://www.musicip.com/, copyright 2006-2007 MusicIP Corporation, printed Feb. 7, 2007, 1 page.

"Digital Music News," http://www.digitalmusicnews.com/results?title=musicstrands, copyright Jun. 2003 Digital Music News, printed Aug. 8, 2006, 5 pages.

"Musicstrands.com Because Music is Social," copyright 2006 MusicStrands, Inc., 2 pages.

"MyStrands for Windows 0.7.3 Beta," copyright 2002-2006 ShareApple.com networks, printed Jul. 16, 2007, 3 pages.

"MyStrands for Windows Change Log," http://www.mystrands.com/mystrands/windows/changelog.vm, printed Jul. 16, 2007, 6 pages.

"MyStrands Download," http://www.mystrands.com/overview.vm, printed Feb. 7, 2007, 3 pages.

"Napster—All the Music You Want," http://www.napster.com/using_napster/all_the_music_you_want.html, copyright 2003-2006 Napster, LLC, printed Feb. 7, 2007, 2 pages.

"Try Napster free for 7 Days—Play and download music without paying per song.," http://www.napster.com/choose/index.html, copyright 2003-2007 Napster, LLC, printed Feb. 7, 2007, 1 page.

"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.

"Rhapsody—Full-length music, videos and more—FREE," http://www.rhapsody.com/welcome.html, copyright 2001-2007 Listen.com, printed Feb. 7, 2007, 1 page.

Badrul M. Sarwar et al., "Recommender Systems for Large-scale E-Commerce: Scalable Neighborhood Formation Using Clustering," 2002, 6 pages.

"Soundflavor," http://www.soundflavor.com/, copyright 2003-2007 Soundflavor, Inc., printed Feb. 7, 2007, 1 page.

"that canadian girl>>Blog Archive>>GenieLab," http://www.thatcanadiangirl.co.uk/blog/2005/02/22/genielab/, copyright 2007 Vero Pepperrell, printed Feb. 16, 2007, 3 pages.

"UpTo11.net—Music Recommendations and Search," http://www.upto11.net/, copyright 2005-2006 Upto11.net, printed Feb. 7, 2007, 1 page.

"Webjay—Playlist Community," http://www.webjay.org/, copyright 2006 Yahoo! Inc., printed Feb. 7, 2007, 5 pages.

"Wired News:," http://www.wired.com/news/digiwoo/1,57634-0.html, copyright 2005 Lycos, Inc., printed Oct. 9, 2006, 3 pages.

"Yahoo! Messenger—Chat, Instant rnessage, SMS, PC Calls and More," http://messenger.yahoo.com/webmessengerpromo.php, copyright 2007 Yahoo! Inc., printed Oct. 26, 2007, 1 page.

"Yahoo Music Jukebox—Wikipedia, the free encyclopedia," http://en.wikipedia.org/wikiYahoo_music_engine, printed Aug. 8, 2006, 1 page.

"Goombah—Preview," http://www.goombah.com/preview.html, printed Jan. 8, 2008, 5 pages.

Jeff Mascia et al., "Lifetrak: Music In Tune With Your Life," copyright 2006, 11 pages.

* cited by examiner

SYSTEM AND METHOD FOR REFINING MEDIA RECOMMENDATIONS

FIELD OF THE INVENTION

The present invention relates to an archiving system for a user's media collection and more specifically relates to an archiving system that refines media recommendations made to a user from an e-commerce service based on an archive of the user's media collection.

BACKGROUND OF THE INVENTION

Numerous e-commerce services, such as Apple's iTunes and Amazon.com, recommend music to a user based on the user's purchase history or the purchase histories of other users. However, the user's purchase history may not provide an accurate representation of the user's music preferences in that the purchase history may identify only a very small subset of the user's entire music collection. The recommendations of these e-commerce services could be improved by applying information identifying all songs in the user's music collection and habits or preferences of the user. However, in many cases, these e-commerce services are implemented as pure web sites. As such, it would be difficult for these e-commerce services to obtain information regarding the user's music collection. Further, the user may be uncomfortable with the idea of allowing multiple entities to track information regarding his or her habits or preferences and the music that he or she owns.

Thus, there is a need for a system and method for refining music recommendations provided to a user from one or more e-commerce services based on the user's entire music collection. There is further a need for such a system and method for refining music recommendations that eliminates the need to store information regarding the user's entire music collection in association with each of the e-commerce services.

SUMMARY OF THE INVENTION

The present invention provides an archiving system for archiving a user's media collection, such as a music collection, and refining recommendations made to the user by an e-commerce service, such as an e-commerce website, based on the archive of the user's media collection. In general, a central archiving system interacts with a user system to archive a user's media collection, which may include songs, videos, or a combination of songs and videos. Thereafter, while the user is interacting with the e-commerce service, a list of recommended media for the user is generated and provided to the archiving system. The archiving system refines the list based on the archive of the user's media collection. Optionally, the list of recommended media may be further refined based on a user profile and play history of the user. The refined list of recommended media is returned to the e-commerce service and presented to the user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to an archiving system for archiving a user's media collection and refining recommendations made to the user by an e-commerce service, such as an e-commerce website, based on the archive of the user's media collection. In general, an archiving system communicates with a user system, which stores the user's media collection, in order to generate an archive of the user's media collection. Once the user's media collection is archived, the archiving system may be used to improve, or refine, recommendations made to the user by an e-commerce service. In general, while the user is interacting with the e-commerce service, a recommendation engine associated with the e-commerce service generates a list of recommended media for the user. The list of recommended media may be a list of recommended music albums, songs, movies, television programs, or the like or any combination thereof. The e-commerce service provides the list of recommended media to the archiving system, wherein the archiving system refines the list based on the archive of the user's media collection. Optionally, the list of recommended media may be further refined based on a user profile and play history of the user. The refined list of recommended media is returned to the e-commerce service and presented to the user.

Figure 1:
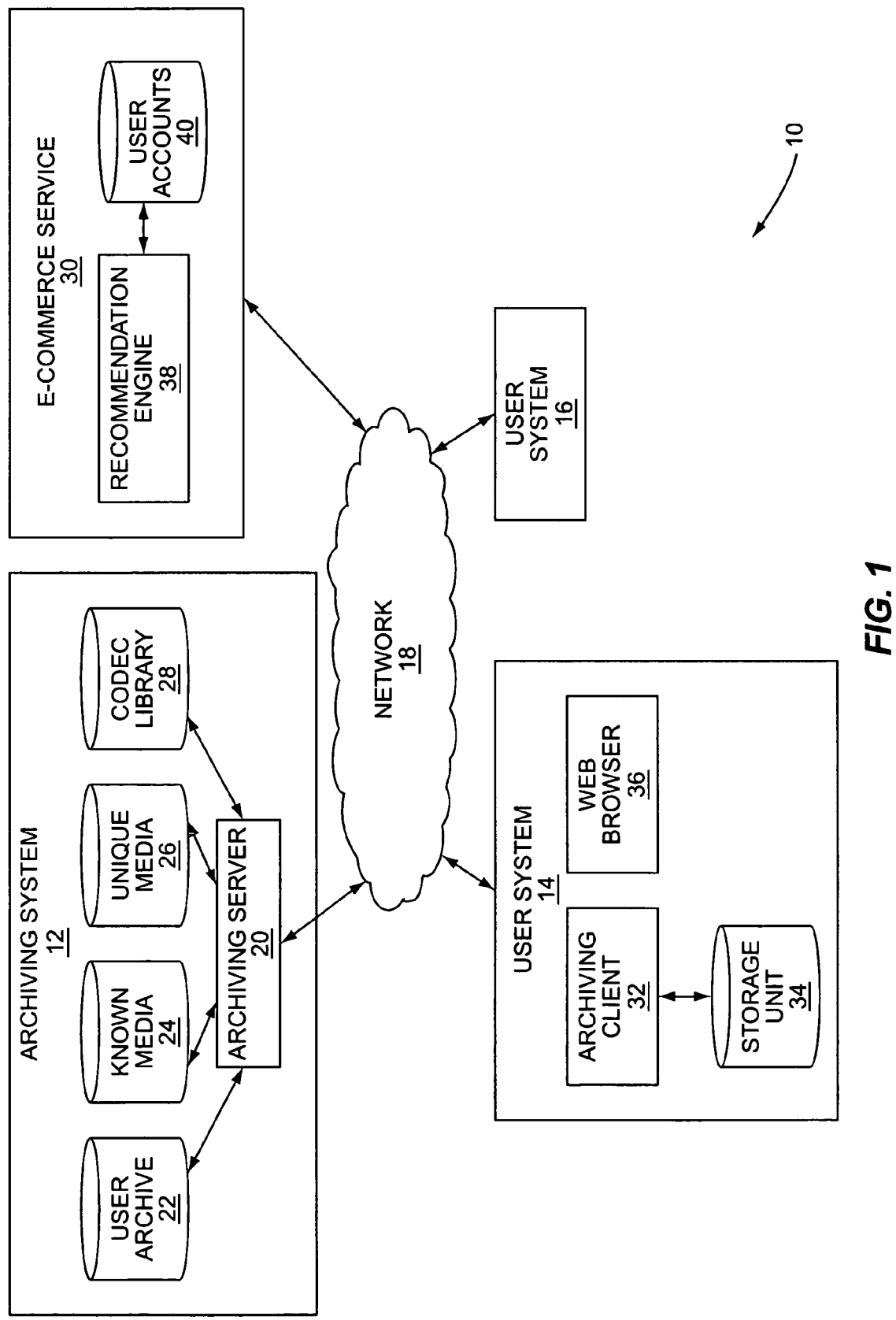
FIG. 1 illustrates a system for archiving a user's media collection and refining media recommendations made to the user via an e-commerce service based on the archive of the user's media collection according to one embodiment of the present invention.

FIG. 1 illustrates a system 10 for archiving a user's media collection and refining recommendations made to the user at an e-commerce service based on the archive of the user's media collection according to one embodiment of the present invention. In general, the system 10 includes an archiving system 12 and a number of user systems 14 and 16 communicatively coupled by a network 18, which is preferably the Internet. The archiving system 12 includes an archiving server 20 and a number of databases 22-28. The archiving server 20 may be implemented in hardware, software, or a combination of hardware and software. In addition, although the archiving server 20 is illustrated as a single block, the archiving server 20 may be implemented as a single server or a number of distributed servers. As discussed below in detail, the archiving server 20 operates to archive user media collections residing on the user systems 14 and 16. In addition, the archiving server 20 operates to refine recommendations made to a user of either of the user systems 14, 16 by an e-commerce service 30 based on the archive of the user's media collection.

The databases 22-28 include a user archive database 22, a known media database 24, a unique media database 26, and a Coding-Decoding (CODEC) library 28. While the databases 22-28 are illustrated as separate databases, the databases 22-28 may be implemented in one or more storage units, such as, but not limited to, one or more hard-disc drives. The user archive database 22 operates to store archives of the media collections residing on the user systems 14, 16. In this example, for each of the user systems 14, 16, the user archive database 22 stores a user archive record operating as an archive of the user's media collection. The media collections may include songs, videos, or a combination thereof. The videos may be movies, television programs, or the like.

In one embodiment, the user archive record includes a user profile, archival information operating as an archive of the user's media collection, and a play history for the user. The user profile may include information identifying the user; demographic information such as, but not limited to, age, sex, marital status, and the like; and user preferences such as, but not limited to, favorite music genre, favorite artist, favorite album, favorite song, favorite time period, favorite movie genre, favorite movie, favorite actors, favorite producers, favorite television program genre, favorite television program, and the like.

For each non-unique media file in the associated media collection, the archival information includes an identifier, such as a GUID, identifying the media content of the media file; CODEC information identifying the CODEC or encoding algorithm of the media file; and optionally one or more quality parameters. A non-unique media file is a media file having media content known to the archiving server 20 and encoded with a CODEC or encoding algorithm known to the archiving server 20. The quality parameters vary depending on the particular CODEC or encoding algorithm for the media file. For example, if a particular media file in the user's media collection is a song encoded in the Moving Pictures Expert Group (MPEG) Audio Layer 3 (MP3) format, the quality parameters may include bit rate and sampling frequency.

For each unique media file in the associated media collection, the archive record includes a reference to the unique media file, where the unique media file has been uploaded from the user system 14 and stored in the unique media database 26. A unique media file is a media file including media content that is unknown to the archiving server 20, a media file having media content encoded with a CODEC or encoding algorithm that is unknown to the archiving server 20, or a media file including media content that is both unknown to the archiving server 20 and encoded with a CODEC or encoding algorithm that is unknown to the archiving server 20. In addition, for each unique media file, the user archive record may include one or more identification parameters and information identifying the CODEC or encoding algorithm for the media file. As discussed below, the identification parameters and information identifying the CODEC or encoding algorithm for the media file may be used by the archiving server 20 to identify the media content of the media file and/or the CODEC or encoding algorithm for the media file when new media content and/or new CODECs or encoding algorithms become known to the archiving server 20.

The play history may include information identifying media files from the user's media collection played by the user at the associated user system 14, 16 or on a portable media player such as, but not limited to, an iPod or MP3 player associated with the user system 14, 16. Preferably, the information identifying a media file is the GUID identifying the media content of the media file. In addition, the play history may include information such as, but not limited to, a time and date that each media file was played and a duration of the play event. The duration of the play event may be used by the archiving server 20 to determine whether the entire media file was played or whether playback was stopped before the media file had ended. The play duration may provide an indication as to whether the user liked the media file. For example, if the user stopped playback of a particular media file less than half-way through the song, the archiving server 20 may determine that the user disliked the media content of the media file. The play history is provided to the archiving server 20 from the user system 14, 16. The play history may be provided, for example, either periodically or as media files are played at the user system 14, 16. If the media files are played on an associated portable media player, the play history may be provided to the user system 14, 16 when the portable media player is docked to the user system 14, 16. The user system 14, 16 may then provide the play history from the portable media player to the archiving server 20.

The known media database 24 operates to store high-quality reference media files corresponding to media content such as a number of songs, movies, television programs, or the like. The media files stored in the known media database 24 may be CD or DVD quality or better and may be stored in either an uncompressed format or a lossless compression format. The media files in the known media database 24 may be obtained, for example, from an original source such as, but not limited to, an original CD or DVD, an Internet service such as Apple's iTunes, or the like. In addition, the known media database 24 may store metadata and one or more fingerprints describing the media content for each media file in the known media database 24. For example, for a song, the metadata may include, but is not limited to, genre, artist, album, song title, year released, lyrics, image of the album cover, and the like.

The unique media database 26 operates to store binary files corresponding to media files in media collections archived by the archiving systems 12 that are unique to the archiving server 20. As used herein, a media file is unique when the media content of the media file is unknown to the archiving server 20, when the media content in the media file is encoded with a CODEC or encoding algorithm that is not known to the archiving server 20, or when the media content of the media file is unknown to the archiving server 20 and encoded with a CODEC or encoding algorithm that is unknown to the archiving server 20. The media content of a media file is unknown to the archiving server 20 when a high-quality reference media file corresponding to the media content is not stored in the known media database 24. A CODEC or encoding algorithm is unknown to the archiving server 20 when the CODEC or encoding algorithm is not stored in the CODEC library 28. The CODEC library 28 stores a number of known CODECs or encoding algorithms. As discussed below, when the archiving system 12 restores a user's media collection, non-unique media files in the user's media collection can be recreated by the archiving server 20 based on corresponding high-quality reference media files stored in the known media database 24 and associated CODECs or encoding algorithms from the CODEC library 28.

The following discussion of the user system 14 is equally applicable to the user system 16. The user system 14 may generally be any user device or combination of devices used to store a user's media collection and that has a connection to the network 18. For example, the user system 14 may be a personal computer. The user system 14 includes an archiving client 32, a storage unit 34, and a web browser 36. The archiving client 32 is preferably implemented in software, but is not limited thereto. As discussed below in detail, the archiving client 32 operates to discover the user's media collection stored in the storage device 34 and interact with the archiving server 20 to archive the user's media collection. The storage unit 34 may be any type of storage device such as, but not limited to, a hard-disc drive and operates to store a number of song files or video files corresponding to the media files in the user's media collection. The web-browser 36 is preferably implemented in software and enables the user of the user system 14 to view and interact with the e-commerce service 30. Note that the web browser 36 is exemplary and not intended to limit the scope of the present invention. For example, rather than the web browser 36, the user system 14 may include a custom application for interacting with the e-commerce service 30. As example of such a custom application is Apple's iTunes.

The e-commerce service 30 is preferably implemented on a third-party server or a number of distributed third-party servers. In general, the e-commerce service 30 includes a recommendation engine 38 and a user accounts database 40. As discussed below, the recommendation engine 38 operates to generate a list of recommended media for the user of the user system 14, 16 while the user is interacting with the e-commerce service 30. The list of recommended media may include recommended albums, songs, movies, television programs, or the like or any combination thereof. The recommendation engine 38 provides the list of recommended media to the archiving server 20, where the list of recommended media is refined based on the archive of the user's media collection. The refined list of recommended media is provided to the e-commerce service 30 and presented to the user of the user system 14, 16 via the web browser 36.

Figure 2:
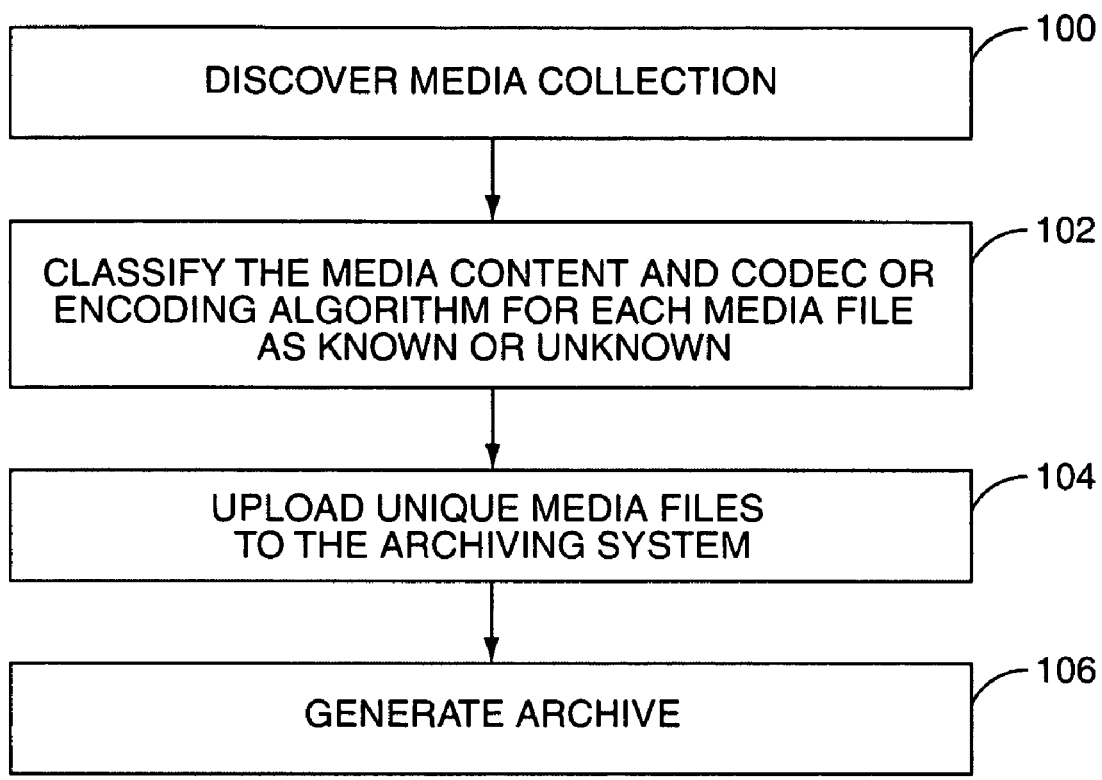
FIG. 2 illustrates the operation of the system of FIG. 1 to archive a user's media collection according to one embodiment of the present invention.

FIG. 2 illustrates the operation of the system 10 of FIG. 1 to archive the user's media collection stored in the storage unit 34 of the user system 14 according to one embodiment of the present invention. First, the archiving client 32 operates to discover the user's media collection stored in the storage unit 34 (step 100). The archiving client 32 may discover the user's media collection by scanning the storage unit 34 for song or video files forming the user's media collection. For example, if the storage unit 34 is a hard-disc drive having a file system including a number of directories, the archiving client 32 may scan all directories or directories selected by the user to discover the songs or video files in the user's media collection.

At this point, the archiving client 32 and the archiving server 20 operate together to classify the media content of each media file in the user's media collection and the CODEC or encoding algorithm for each media file as either known or unknown (step 102). More specifically, as discussed below in detail, the archiving client 32 provides one or more identification parameters for the media content of each of the media files to the archiving server 20. Based on the identification parameters, the archiving server 20 classifies the media content of each media file as either known or unknown. Known media content is media content which is known by the archiving server 20. More specifically, media content is known to the archiving server 20 if a high-quality reference media file corresponding to the media content is stored in the known media database 24. In addition, the CODEC or encoding algorithm for each song is classified as known or unknown by determining whether the CODEC or algorithm is stored in the CODEC library 28.

The identification parameters provided to the archiving server 20 and used to classify the media content of the media files in the user's collection as either known or unknown may vary. As discussed below with respect to FIGS. 3-6, in a first embodiment, the identification parameters include one or more fingerprints for the media content of each media file in the user's media collection. In a second embodiment, the identification parameters include one or more samples of the media content of each media file in the user's media collection, rather than fingerprints. In a third embodiment, the identification parameters include metadata describing the media content each media file in the user's media collection and fingerprints of the media content of a select number of the media files. In a fourth embodiment, the identification parameters include metadata describing the media content of each media file in the user's media collection and one or more samples of the media content of a select number of the media files.

Once the media content of the media files in the user's media collection and the associated CODECs or encoding algorithms are classified as known or unknown, unique media files are uploaded from the user system 14 to the archiving server 20 and stored in the unique media database 26 (step 104). As discussed above, a unique media file is a media file having media content that is unknown to the archiving server 20, encoded using a CODEC or encoding algorithm that is unknown to the archiving server 20, or both unknown to the archiving server 20 and encoded using CODEC or encoding algorithm that is unknown to the archiving server 20.

At this point, the archive of the user's media collection may be generated (step 106). More specifically, in one embodiment, a user archive record is generated. For each media file in the user's media collection having media content that is classified as known and encoded with a known CODEC or encoding algorithm, the archive record includes information identifying the media content of the media file, such as a GUID, CODEC information identifying the CODEC or encoding algorithm for the media file, and optionally one or more quality parameters. In addition, the archive record may include metadata describing the media content of the media file. The quality parameters are parameters such as, but not limited to, bit rate and sampling frequency. The quality parameters may be desired to ensure that when the user's media collection is restored by the archiving system 12, the copies of the media files provided to the user system 14 are substantially, if not exactly, the same as the media files originally in the user's media collection. In addition, the quality parameters ensure that a user does not obtain a higher or lower quality version of a media file than he or she originally had in his or her media collection.

For each unique media file in the user's media collection, the user archive record includes a reference to the unique media file, which has been uploaded and stored in the unique media database 26. Alternatively, the unique media file may be stored within the archive record. In addition, for each unique media file, the archive record may include one or more fingerprints for the unique media file and optionally one or more other identification parameters; information identifying the CODEC or encoding algorithm for the media file; and optionally one or more quality parameters. The identification parameters and the information identifying the CODEC or encoding algorithm may thereafter be used by the archiving server 20 to determine whether to reclassify the unique media file as a non-unique media file when a new media file is added to the known media database 24 or a new CODEC or encoding algorithm is added to the CODEC library 28.

Figure 3:
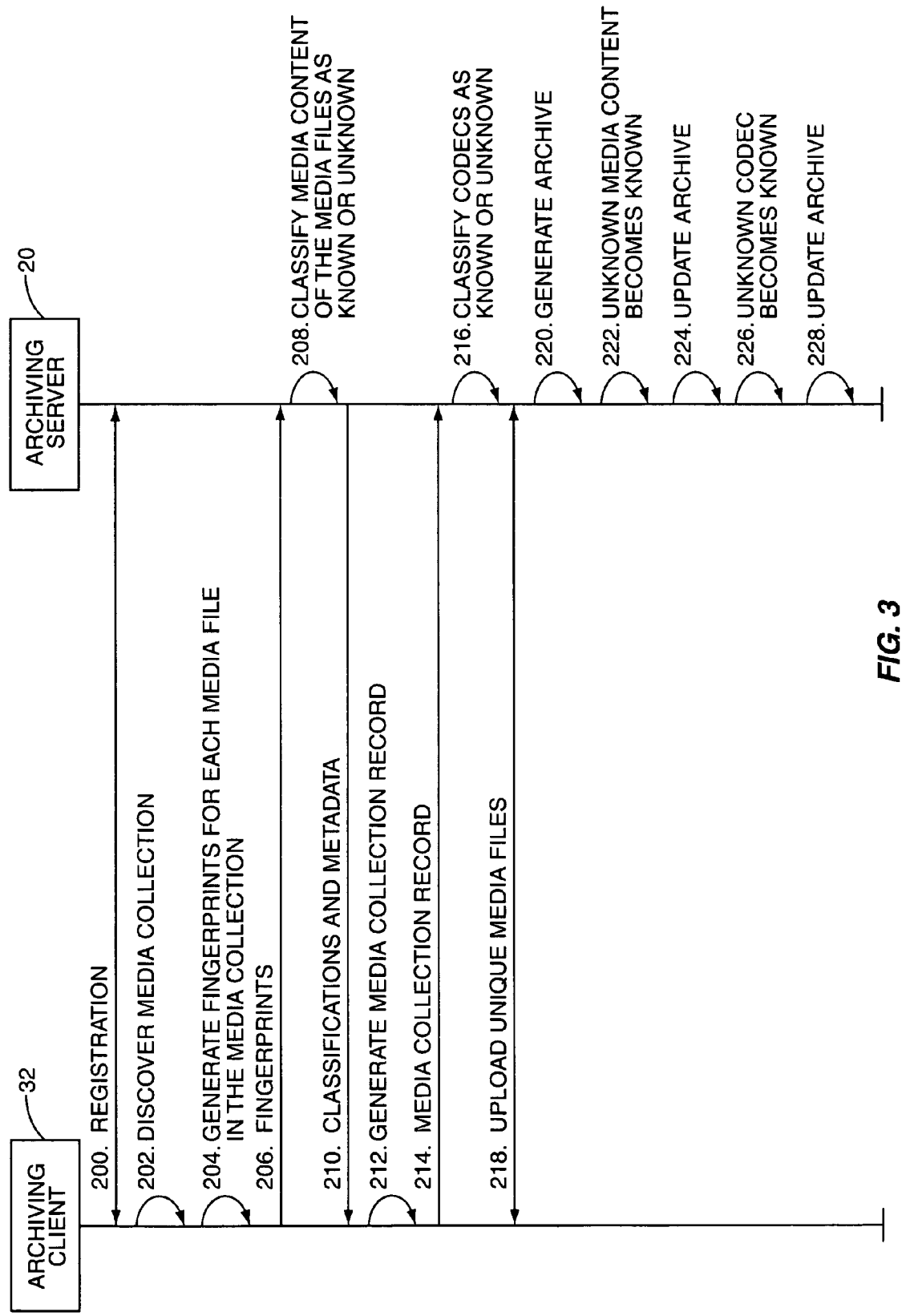
FIG. 3 is a more detailed illustration of the operation of the system of FIG. 1 to archive a user's media collection according to a first embodiment of the present invention.

FIG. 3 is a more detailed illustration of the operation of the system 10 of FIG. 1 to archive a user's media collection according to a first embodiment of the present invention. First, the archiving client 32 interacts with the archiving server 20 to register a user of the user system 14 with the archiving system 12 (step 200). Registration may include providing information identifying the user to the archiving system 12. The information identifying the user may include, for example, user's name, home address, telephone number, email address, and the like. In addition, the user may be asked to enter demographic information such as, for example, age, sex, and marital status, and user preferences such as, for example, favorite music genre, favorite music artist, favorite movie genre, favorite movie, favorite television program genre, or the like. Next, the archiving client 32 discovers the user's media collection (step 202). More specifically, the archiving client 32 may scan the storage unit 34 to discover the media files in the user's media collection.

In this embodiment, the archiving client 32 then generates one or more fingerprints for the media content of each media file in the user's media collection (step 204). In general, for each media file, the archiving client 32 analyzes one or more segments of the media content of the media file to determine, for example, beats-per-minute and/or compute a Fast Fourier Transform (FFT), thereby providing fingerprints for the media file. The segments of the media content of the media file analyzed to generate the fingerprints may be selected at random. For a more detailed discussion of generating fingerprints for a song and identifying the song based on the fingerprints, see U.S. Pat. No. 6,990,453, entitled SYSTEM AND METHODS FOR RECOGNIZING SOUND AND MUSIC SIGNALS IN HIGH NOISE AND DISTORTION, issued Jan. 24, 2006, which is hereby incorporated by reference in its entirety.

Once the fingerprints are generated, the archiving client 32 provides the fingerprints for each media file in the user's media collection to the archiving server 20 (step 206). The fingerprints for the media files may be provided immediately after they are generated, periodically in a batch process, or once after all of the fingerprints for the media files in the user's media collection are generated.

Using the fingerprints, the archiving server 20 classifies the media content of each media file in the user's media collection as either known or unknown (step 208). More specifically, for each of the media files in the user's media collection, the archiving server 20 compares the fingerprints of the media content of the media file to fingerprints of the media content of the media files stored in the known media database 24 to determine whether the media content of the media file corresponds to the media content of one of the media files stored in the known media database 24. The fingerprints for the media files stored in the known media database 24 may be generated by the archiving server 20 when the media files are initially added to the known media database 24 and stored in the known media database 24. Based on the comparisons of the fingerprints of the media content of the media files in the user's media collection and the fingerprints of the media content of the media files stored in the known media database 24, the archiving server 20 classifies the media content of each media file in the user's media collection as either known or unknown.

The archiving server 20 then returns the classifications of the media content of the media files in the user's media collection to the archiving client 32 (step 210). In addition to the classification for the media content of each of the media files, a GUID for each media file having known media content may also be provided. Optionally, the archiving server 20 may additionally return the metadata describing the media content of the media files in the user's media collection having known media content. As an example, for a song, the metadata may include information such as, but not limited to, artist, album, title, genre, year released, lyrics, image of the album cover, and the like. The metadata may be obtained from the headers of the media files stored in the known media database 24 or obtained from a third party source such as, but not limited to, Gracenotes or Musicbrainz. Once the metadata is received by the archiving client 32, the archiving client 32, or an associated application, may store the metadata for each of the associated media files in the headers of the associated media files or correct the metadata already stored in the headers of the associated media files. For example, if a media file is an MP3 file, the metadata may be used to create or correct the ID3 tags stored in the MP3 file. In addition, the metadata may be used to generate new file names for the media files, create a new directory structure in the storage unit 34, or both, as will be apparent to one of ordinary skill in the art upon reading this disclosure.

After receiving the classifications from the archiving server 20, the archiving client 32 generates a media collection record defining the user's media collection (step 212). For each media file having known media content, the media collection record may include the GUID provided from the archiving server 20 identifying the media content of the media file, information identifying the CODEC or encoding algorithm used to encode the media file, and optionally one or more quality parameters. For each media file having unknown media content, the media collection record may include one or more identification parameters, information identifying the CODEC or encoding algorithm used to encode the media file, and one or more quality parameters. In this embodiment, the identification parameters for the media files having unknown media content include the fingerprints generated for the media files. In addition, the identification parameters may include metadata describing the media content of the media files, the file names of the media files, and the like. The archiving client 32 then provides the media collection record to the archiving server 20 (step 214).

At this point, the archiving server 20 classifies the CODEC or encoding algorithm for each media file as either known or unknown (step 216). Thereafter, the archiving server 20 identifies unique media files in the user's media collection and interacts with the archiving client 32 to upload the unique media files to the archiving server 20 (step 218). As discussed above, a unique media file is a media file having media content that is unknown to the archiving server 20, encoded with a CODEC or encoding algorithm that is unknown to the archiving server 20, or both. The unique media files are stored in the unique media database 26.

The archiving server 20 then generates an archive of the user's media collection (step 220). More specifically, in one embodiment, a user archive record is generated. For each media file in the user's media collection having media content that is classified as known and encoded with a known CODEC or encoding algorithm, the archive record includes information identifying the media content of the media file, such as the GUID provided by the archiving server 20, information identifying the CODEC or encoding algorithm for the media file, and optionally one or more quality parameters. In addition, the archive record may include metadata describing the media content of the media file. For each unique media file in the user's media collection, the user archive record includes a reference to the unique media file in the unique media database 26, the identification parameters including the one or more fingerprints for the media file, information identifying the CODEC or encoding algorithm for the media file, and optionally one or more quality parameters. Alternatively, the unique media file may be stored within the archive record. The identification parameters and the information identifying the CODEC or encoding algorithm for each unique media file may thereafter be used by the archiving server 20 to determine whether to reclassify the unique media file when a new media file is added to the known media database 24 or a new CODEC or encoding algorithm is added to the CODEC library 28.

In this example, unknown media content may become known to the archiving server 20 (step 222). This occurs when a new media file is added to the known media database 24. The new media file may be obtained from, for example, an original source such as a CD or DVD or an online media delivery service such as, but not limited to, Apple's iTunes. When previously unknown media content becomes known, the archiving server 20 operates to update the archive of the user's media collection (step 224). For example, if a particular new media file becomes known, the archiving server 20 generates one or more fingerprints for the media content of the new media file and compares the fingerprints to the fingerprints for the unique media files in the user's media collection. If a unique media file having media content corresponding to the media content of the new media file is included within the user's media collection, the archiving server 20 determines whether the CODEC or encoding algorithm used to encode the unique media file in the user's media collection is known. If not, the media file in the user's media collection remains classified as unique. If so, the archiving server 20 reclassifies the media file in the user's media collection as a non-unique media file, which is a media file having known media content encoded with a known CODEC or encoding algorithm. Once reclassified, the archive record is updated such that a GUID identifying the media content, information identifying the CODEC or encoding algorithm, and optionally one or more quality parameters are stored for the reclassified media file. The unique media file may then be removed from the unique media database 26.

In a similar fashion, an unknown CODEC or encoding algorithm may become known to the archiving server 20 by adding the CODEC or encoding algorithm to the CODEC library 28 (step 226). In response, the archiving server 20 updates the archive of the user's media collection (step 228). For example, if a particular unknown CODEC becomes known, the archiving server 20 determines whether there are unique media files in the user's media collection having known media content encoded with the previously unknown CODEC. If so, the archiving server 20 reclassifies the media files encoded with the previously unknown CODEC as non-unique media files, which are known media files encoded with a known CODEC. Once reclassified, the archive record is updated such that a GUID, information identifying the CODEC or encoding algorithm, and optionally one or more quality parameters are stored for the reclassified media files. The unique media files may then be removed from the unique media database 26.

Figure 4:
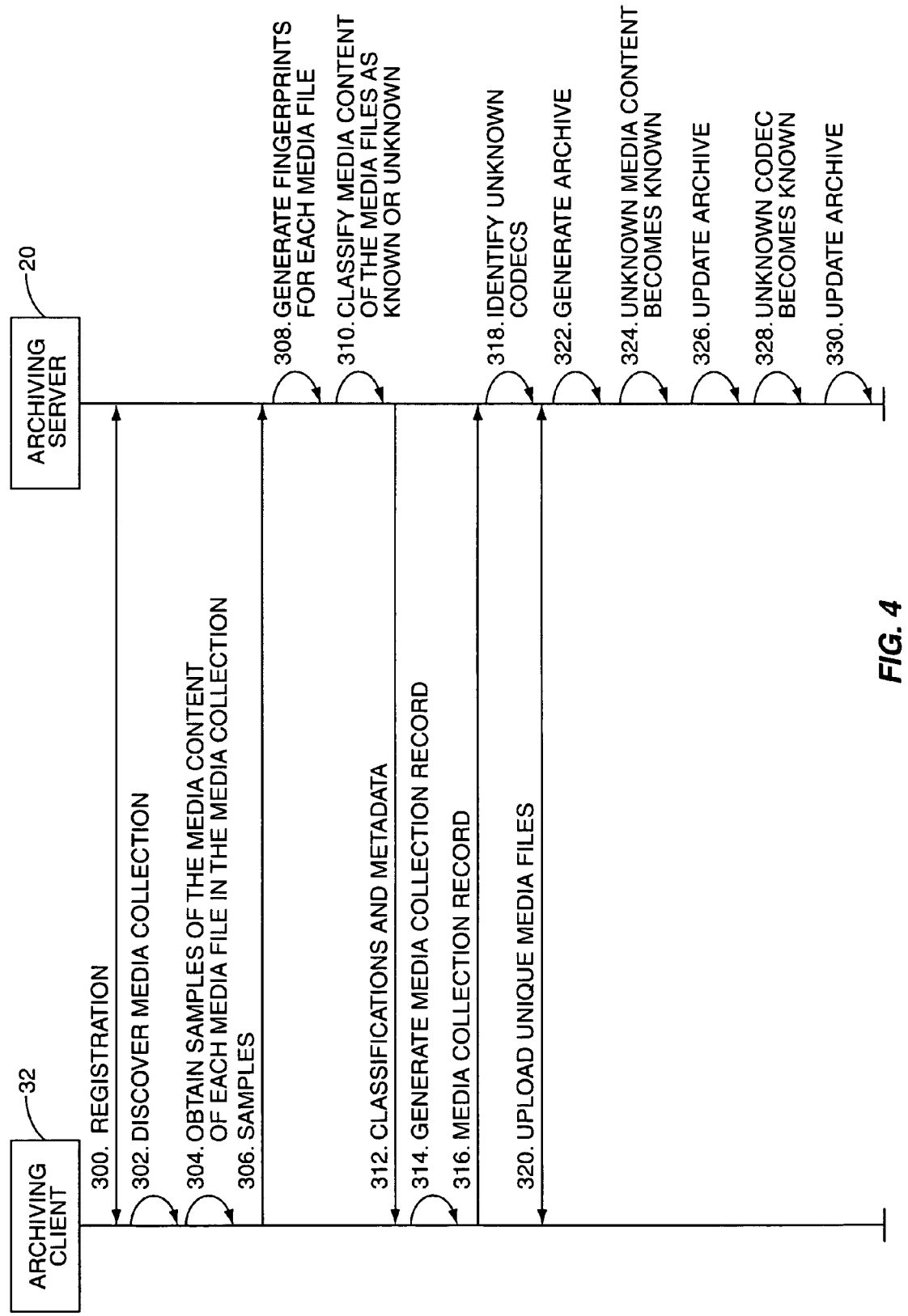
FIG. 4 is a more detailed illustration of the operation of the system of FIG. 1 to archive a user's media collection according to a second embodiment of the present invention.

FIG. 4 is a more detailed illustration of the operation of the system 10 of FIG. 1 according to a second embodiment of the present invention and is substantially the same as that illustrated in FIG. 3. However, in this embodiment, the fingerprints for the media files in the user's media collection are generated by the archiving server 20 rather than the archiving client 32. More specifically, after registration and discovery of the user's media collection (steps 300 and 302), the archiving client 32 obtains one or more samples of the media content of each of the media files in the user's media collection (step 304). The samples are segments of the media content of the media files. The samples are then provided to the archiving server 20, wherein the archiving server 20 generates one or more fingerprints for each media file in the user's media collection based on the samples of the media files (steps 306 and 308). From this point, the process proceeds as described above with respect to FIG. 3 (steps 310-330). As such, the details are not repeated.

Figure 5:
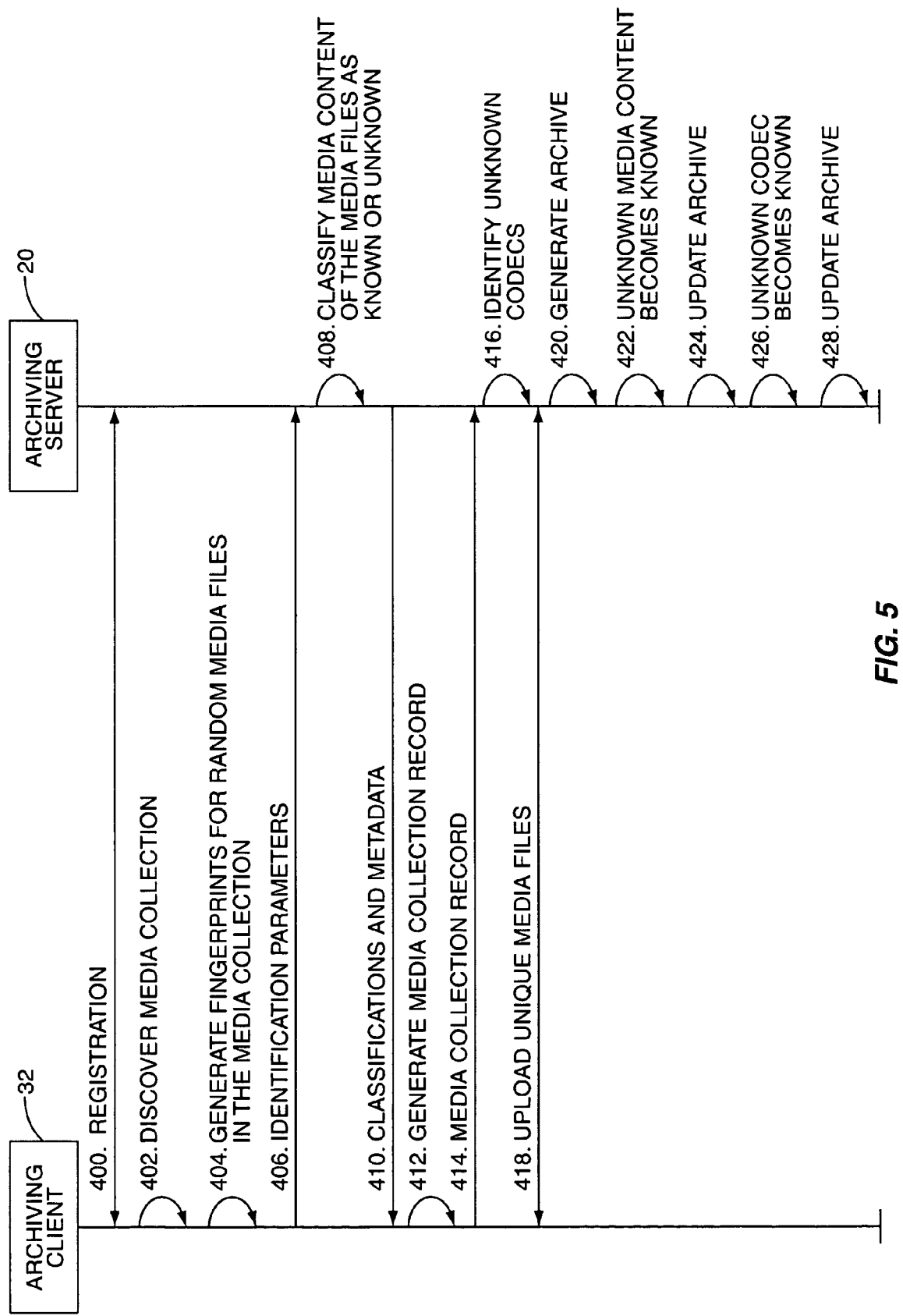
FIG. 5 is a more detailed illustration of the operation of the system of FIG. 1 to archive a user's media collection according to a third embodiment of the present invention.

FIG. 5 is a more detailed illustration of the operation of the system 10 of FIG. 1 according to a third embodiment of the present invention and is similar to the embodiments illustrated in FIGS. 3 and 4. After registration and discovery of the user's media collection (steps 400 and 402), the archiving client 32 generates fingerprints for select ones of the media files in the user's media collection (step 404). Preferably, the select ones of the media files in the user's media collection are selected randomly. In this embodiment, the fingerprints are used, at least in part, to prevent spoofing of the archiving server 20 to obtain unauthorized copies of media files.

Next, one or more identification parameters for each media file in the user's media collection are provided to the archiving server 20 (step 406). For each media file having one or more fingerprints, the identification parameters include the fingerprints and optionally metadata, such as ID3 tags, describing the media content of the media file. For each media file not having a fingerprint, the identification parameters may include metadata, such as ID3 tags, describing the media content of the media file. In addition, the identification parameters for media files having fingerprints and media files not having fingerprints may include a file name of the media file, directory name for the directory in which the media file is stored, and the like.

The archiving server 20 then classifies the media content of each media file as known or unknown based on the identification parameters (step 408). For media files having one or more fingerprints, the archiving server 20 may compare the fingerprints to fingerprints of the media files in the known media database 24 to determine whether the media content of the media files are known or unknown. Alternatively, the archiving server 20 may identify the media content of the media files having one or more fingerprints based on the other identification parameters such as the metadata describing the media content of the media files. Thereafter, for the media files having media content identified as the media content of one of the media files in the known media database 24 based on the other identification parameters, the fingerprints of the media files may be compared to fingerprints of the corresponding media files in the known media database 24 in order to validate that the media content of the media files in the user's media collection corresponds to the media content of the media files stored in the known songs database 24. This may be particularly beneficial to prevent spoofing. More specifically, by comparing the fingerprints, the archiving server 20 prevents a user from obtaining an unauthorized copy of a media file by providing the metadata for a media file which they do not own to the archiving server 20 and then requesting that his or her media collection be restored. The fingerprints provide a method of verifying that the media file is in fact a part of the user's media collection.

For media files not having a fingerprint, the archiving server 20 determines whether the media content of the media files are known or unknown based on the identification parameters provided for the media files. More specifically, the metadata describing the media content of the media files and optionally other information such as file name, directory name, and the like may be used by the archiving server 20 to determine whether the media content of the media files corresponds to the media content of media files stored in the known media database 24.

Once the media content of each of the media files in the user's media collection is classified, the process proceeds as described above with respect to FIG. 3 (steps 410-428). As such, the details are not repeated.

Figure 6:
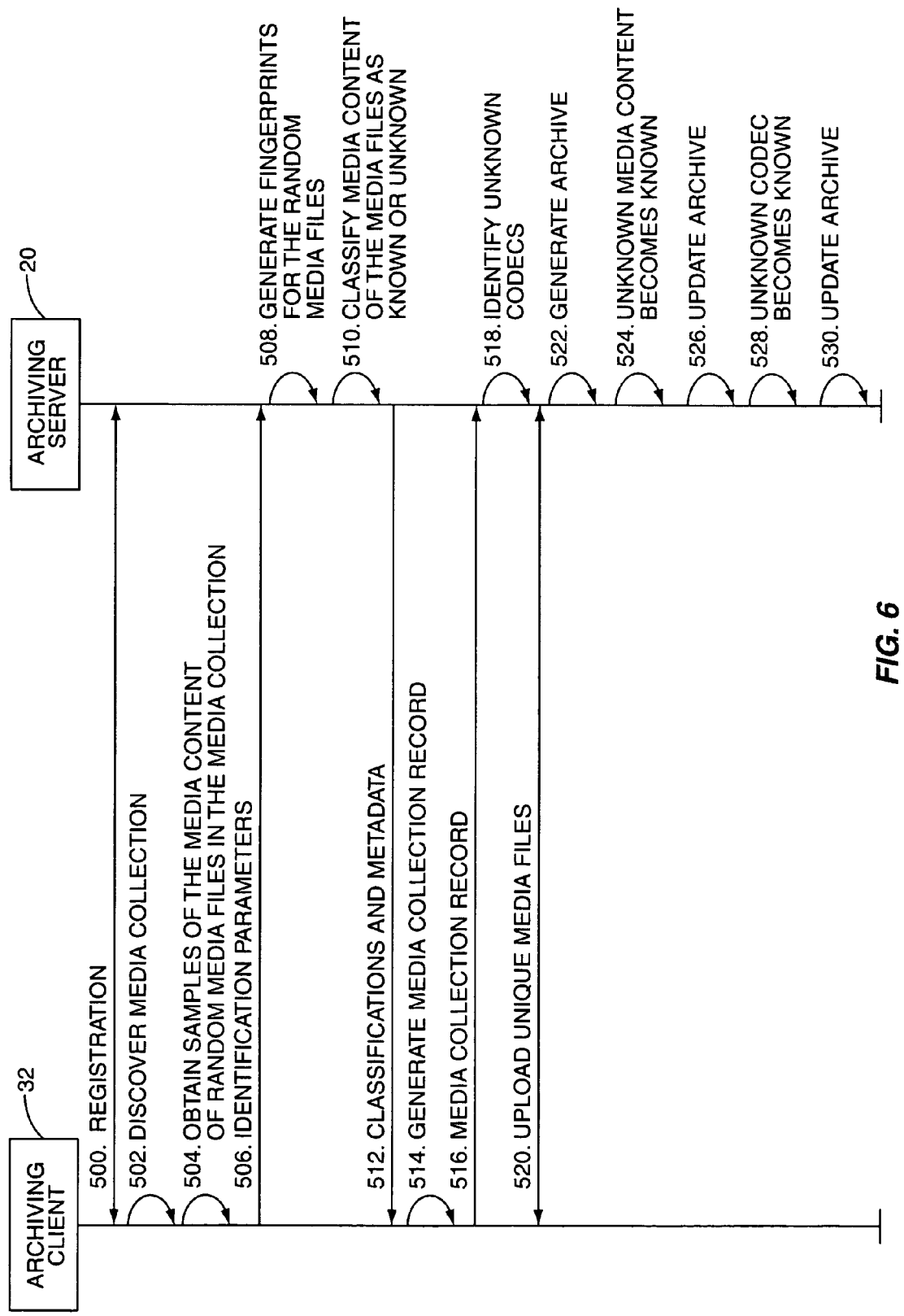
FIG. 6 is a more detailed illustration of the operation of the system of FIG. 1 to archive a user's media collection according to a fourth embodiment of the present invention.

FIG. 6 is a more detailed illustration of the operation of the system 10 of FIG. 1 according to a fourth embodiment of the present invention and is substantially the same as that illustrated in FIG. 5. However, in this embodiment, the fingerprints for the select media files in the user's media collection are generated by the archiving server 20 rather than the archiving client 32. More specifically, after registration and discovery of the user's media collection (steps 500 and 502), the archiving client 32 obtains one or more samples of the media content of select ones of the media files in the user's media collection (step 504). The samples are segments of the media content of the media files. Preferably, the select ones of the media files in the user's media collection are selected at random. The samples are then provided to the archiving server 20, wherein the archiving server 20 generates one or more fingerprints for the select ones of the media files in the user's media collection based on the samples of the media content of the media files (steps 506 and 508). From this point, the process proceeds as described above with respect to FIG. 5 (steps 510-530). As such, the details are not repeated.

Figure 7:
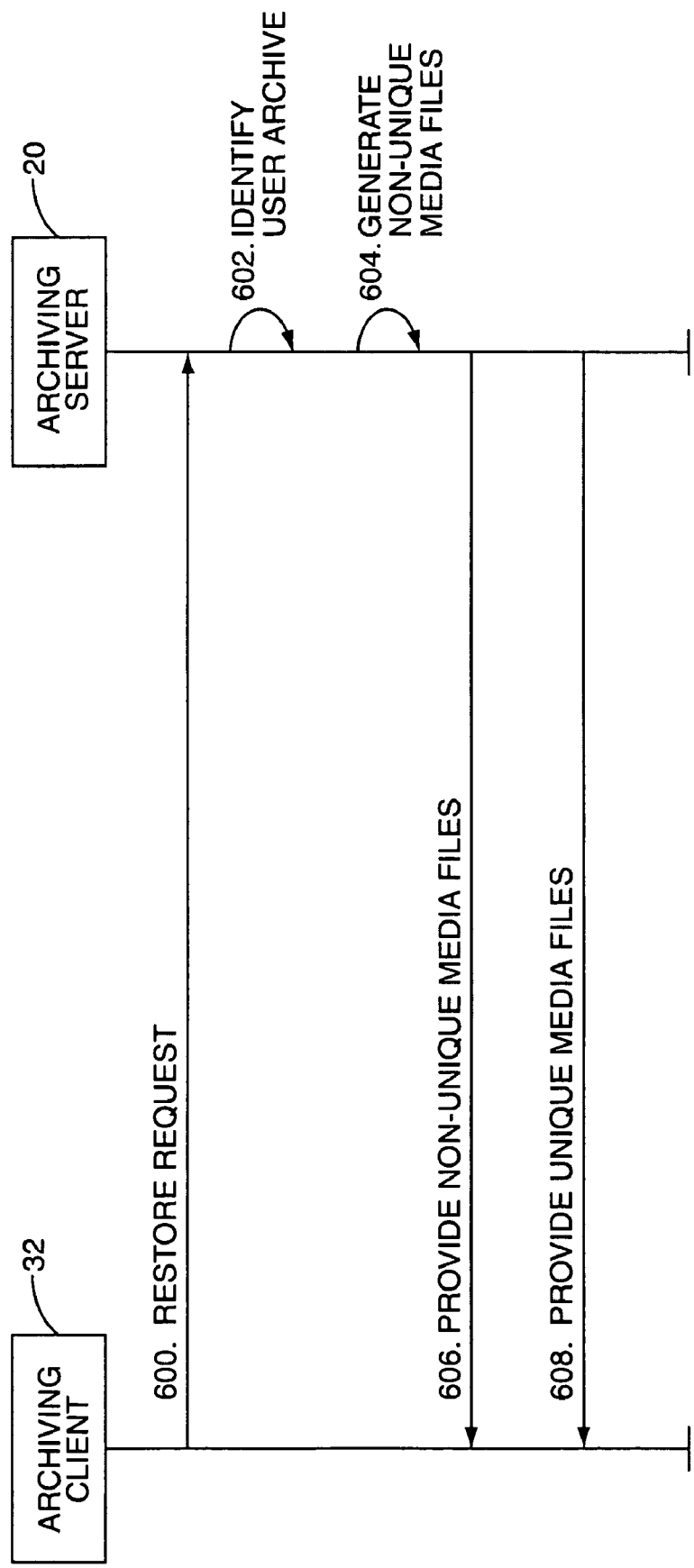
FIG. 7 illustrates the operation of the system of FIG. 1 to restore the user's media collection according to one embodiment of the present invention.

FIG. 7 illustrates the operation of the system 10 of FIG. 1 to restore the user's media collection to the user system 14 after a failure, such as a failure of the storage unit 34, at the user system 14 according to one embodiment of the present invention. In general, the restoration process begins when the archiving client 32 sends a restore request to the archiving server 20 (step 600). The restore request may include information identifying the user of the user system 14 and the archive of the user's media collection. In response to the request, the archiving server 20 identifies the archive of the user's media collection (step 602).

For media files in the user's media collection having media content that is known and encoded with a known CODEC or encoding algorithm, the archiving server 20 generates the media files using the corresponding high-quality reference media files from the known media database 24 and corresponding CODECs or encoding algorithms from the CODEC library 28 (step 604). In addition, the media files may be generated based on the quality parameters for the media files. More specifically, a particular media file in the user's media collection may be generated by encoding the corresponding high-quality reference media file with the associated CODEC or encoding algorithm according to the quality parameters for the media file. As a result, the generated media files are substantially, if not exactly, the same as the original media files in the user's media collection. Further, the user does not acquire higher quality versions of the media files than he or she originally had in his or her media collection.

The generated media files are provided to the archiving client 32 (step 606), and the unique media files in the user's media collection are obtained from the unique media database 26 and provided to the archiving client 32 (step 608). The archiving client 32 stores the media files provided in steps 606 and 608 in the storage unit 34, thereby completing the restoration process.

In an alternative embodiment, rather than generating the non-unique media files in step 604 after receiving the restore request, the archiving server 20 may generate and store a number of versions of each of the media files in the known media database 24 prior to receiving a restore request. More specifically, in one embodiment, the archiving server 20 may generate a version of each of the media files in the known media database 24 for each known CODEC or encoding algorithm. The versions of the media files may be generated, for example, when the media files are added to the known media database 24. In another embodiment, the archiving server 20 may generate a version of each of the media files in the known media database 24 for each combination of quality parameters for each known CODEC or encoding algorithm. As a result, when a restore request is received, the archiving server 20 may obtain the non-unique media files from the known media database 24 rather than regenerating the needed versions of the media files in response to the request. Note that this alternative embodiment still provides substantial benefits over traditional archiving systems where a separate copy of the same version of a media file is stored in multiple user's archives. In this alternative embodiment, only a single copy of each version of a media file is stored, thereby substantially reducing the storage requirements of the archiving system 12.

It should be noted that the processes of FIGS. 3-7 are exemplary and are not intended to limit the scope of the present invention. Numerous variations in the steps and the order in which the steps are performed will be apparent to one of ordinary skill in the art upon reading this disclosure.

The archiving system 12 of the present invention may also be used to refine recommendations provided to a user while the user is browsing the e-commerce service 30. The e-commerce service 30 may be hosted by a third-party server and is associated with the recommendation engine 38, which operates to generate a list of recommended media for a user. As stated above, the list of recommended media may include recommended albums, songs, movies, television programs, or the like or any combination thereof. The e-commerce service 30 may be an e-commerce website enabling users to purchase CDs or DVDs including audio or video content in a manner similar to that used by Amazon.com; an e-commerce website enabling users to purchase and download media; or an e-commerce server that interacts with an application installed on the user system 14, 16 enabling a user to purchase and download media in a manner similar to that used by Apple's iTunes service.

Figure 8:
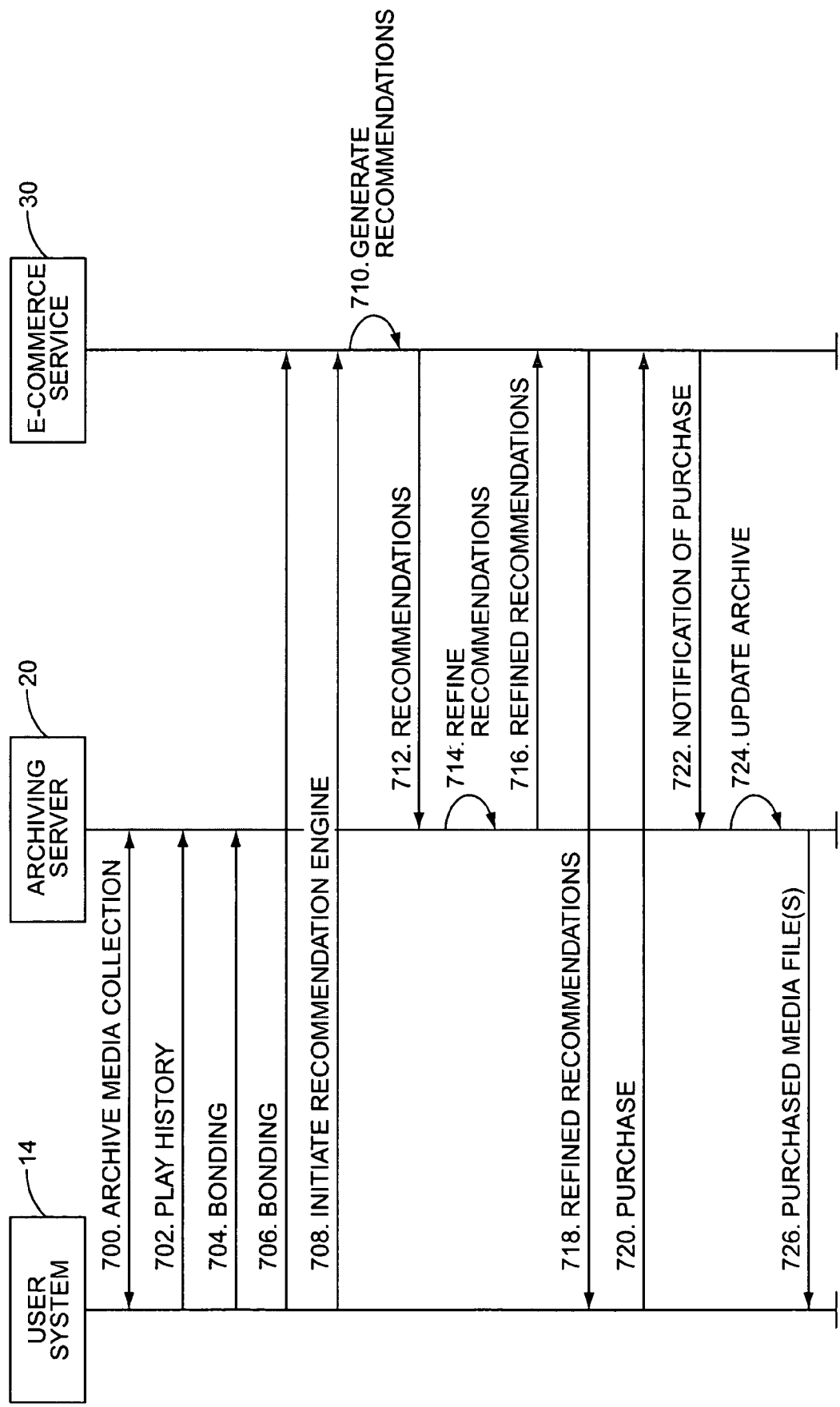
FIG. 8 illustrates the operation of the system of FIG. 1 to refine recommendations provided to a user by an e-commerce service based on the archive of the user's media collection according to one embodiment of the present invention.

FIG. 8 illustrates the operation of the system 10 of FIG. 1 to refine recommendations provided to the user based on the archive of the user's media collection. First, the user system 14 interacts with the archiving server 12 to archive the user's media collection, as described above (step 700). Note that step 700 may be repeated when new media files are added to the user's media collection. After the user's media collection is archived, a play history for the user associated with the user system 14 is provided to the archiving server 20 (step 702). While this is illustrated as a single step, the play history is preferably updated as media files are played by the user. Thus, the play history, or updates to the play history, may be provided to the archiving server 20 periodically or as media files are played by the user. Note that the play history may provide information identifying media files, or more specifically the media content of the media files, played at the user system 14 and optionally media files played on a portable media player associated with the user system 14. In addition, the play history may include the date and time that each media file was last played, a number of dates and times at which each media file was played, a duration of each play event, or any combination thereof.

In order for the e-commerce service 30 to have access to the archiving server 20 for recommendation refinement, the e-commerce service 30 is bonded to the archiving server 20 (steps 704 and 706). In one embodiment, the archiving server 20 may maintain a list of e-commerce services including the e-commerce service 30 defining e-commerce services that are registered with the archiving server 20. The e-commerce services may be registered with the archiving server 20 through a business arrangement between the operators of the archiving server 20 and the operators of the e-commerce services. When registered with the archiving server 20, the e-commerce services are enabled to communicate with the archiving server 20 to have a list of recommended media for a user refined based on the archive of the user's media collection maintained by the archiving server 20.

During, for example, registration with the archiving server 20, the user of the user system 14 may select one or more of the e-commerce services from the list of e-commerce services registered with the archiving server 20 to perform a first step in the bonding process between the archiving server 20 and the e-commerce service 30 (step 704). Alternatively, the user may enter information identifying selected e-commerce services, such as the e-commerce service 30. The information identifying the selected e-commerce services may include Uniform Resource Locators (URLs) of the selected e-commerce services. Thereafter, when the user is visiting the e-commerce service 30, the user may provide a user ID and, optionally, a password to be used by the e-commerce service 30 when communicating with the archiving server 20 to refine recommendations for the user (step 706). The user ID and optional password operate to identify the user, and more specifically the archive of the user's media collection stored by the archiving server 20.

In another embodiment, the user need not select e-commerce services. Rather, the user provides information identifying the archiving system 12, such as the URL of the archiving server 20, and information identifying the archive of the user's media collection to the e-commerce service 30. The e-commerce service 30 may then contact the archiving server 20 using the information provided by the user in order to have a list of recommended media refined by the archiving server 20.

After bonding is complete, the user may interact with the e-commerce service 30 via the user system 14 to initiate the recommendation engine 38 (step 708). The manner in which the recommendation engine 38 is initiated may vary depending on the implementation of the e-commerce service 30. For example, the recommendation engine 38 may be initiated when the user performs a keyword search for a particular song, artist, album, genre of music, movie, movie genre, television program, television program genre, or the like; when the user interacts with the e-commerce service 30 to select a particular genre, artist, or album to view a list of songs from the genre, artist, or album; when the user interacts with the e-commerce service 30 to select an album, song, movie, television program, or the like for preview or purchase; or when the user logs onto the e-commerce service 30.

Once initiated, the recommendation engine 38 generates a list of recommended media for the user (step 710). The list of recommended media may include recommended songs, albums, movies, television programs, or the like. The details of how the list of recommended media is generated are not central to the present invention. One of ordinary skill in the art will recognize numerous methods for generating the list of recommended media. In general, the recommendation engine 38 may generate the list of recommended media based on various criteria such as, but not limited to, a genre selected by the user, an artist selected by the user, an album selected by the user, a song selected by the user, a movie selected by the user, a television program selected by the user, a purchase history of the user stored in the user accounts database 40, a user profile of the user stored in the user accounts database 40, the purchase histories of other users stored in the user accounts database 40, or the like. For example, the recommendation engine 38 may generate the list of recommended media based on a song or album selected by the user and purchases made by other users such that the list or recommended media includes albums or songs purchased by other users that also purchased the album or song selected by the user.

The e-commerce service 30 then provides the list of recommended media to the archiving server 20 (step 712). In addition, the e-commerce service 30 may provide the user ID and optional password entered by the user. Based on the user ID and optional password, the archiving server 20 identifies the archive of the user's media collection. The archiving server 20 then refines the list of recommended media based on the archive of the user's media collection (step 714). Recall that the archive of the user's media collection may include a user profile and play history in addition to the archival information identifying the media files in the user's media collection.

The list of recommended media may be refined by the archiving server 20 in a number of ways. First, the archiving server 20 may refine the list to mark albums, songs, movies, television programs, or the like already within the user's media collection as "owned." If the list includes recommended albums and the user's media collection includes one or more songs in the album but not the entire album, the archiving server 20 may refine the list such that the songs from the album already in the user's media collection are identified or to provide some indication that songs from the album are owned by the user. In addition, the archiving server 20 may prioritize the list of recommended media based on the media files in the user's media collection, the user's play history, the user preferences in the user's user profile, the demographic information in the user's user profile, or any combination thereof. For example, the archiving server 20 may determine the most popular music genre, or preferred music genre, and one or more of the most popular artists, or preferred artists, of songs played by the user within the last month based on the user's play history. Songs or albums in the list of recommended media from the most popular music genre or artists may be given a higher priority than the other albums or songs in the list. As another example, the archiving server 20 may identify preferred music genres and artists by determining the most popular music genres and artists in the user's media collection. As yet another example, the user profile of the user may include a favorite music genre and artist, and the archiving server 20 may assign high priorities to songs or albums from the user's favorite genre or by the user's favorite artist. In a similar fashion, preferred movie or television program genres may be determined. Numerous variations of prioritizing the list of recommended media based on the criteria listed above will be apparent to one of ordinary skill in the art upon reading this disclosure.

The refined list of recommended media is returned to the e-commerce service 30 (step 716). The e-commerce service 30 then provides the list of recommended media, or a portion thereof, to the user at the user system 14 (step 718). The refined list may be provided to the user via the web browser 36. Before presenting the refined list, media files already owned by the user may optionally be removed from the list. For albums for which the user owns one or more songs but not the entire album, the refined list may identify the songs from the album already owned by the user or provide some indication that songs from the album are already owned by the user. In addition, if songs from the album are already owned, the e-commerce service 30 may offer the album at a reduced price or recommend the remaining songs from the album rather than the entire album. A television series may be handled in a similar fashion. If prioritized, the refined list either provides a priority in association with each recommended media or prioritizes the list such that media having a high priority is located at the top of the list.

At this point, the user may optionally interact with the e-commerce service 30 via the user system 14 to purchase either an originally selected media file or media from the list of recommended media (step 720). In response, the e-commerce service 30 may notify the archiving server 20 of the purchase (step 722). As a result, if the media content of the purchased media file is known to the archiving server 20, the archiving server 20 may update the archive of the user's media collection to include the purchased media file (step 724). The CODEC or encoding algorithm for the purchased media file may be a preferred CODEC or encoding algorithm identified by the user or a default CODEC or encoding algorithm for the archiving server 20. In addition, the quality parameters for the archive may be default CD or DVD quality parameters. For example, CD quality parameters may be 2 channel, 16 bit, 44 kHz PCM. The purchased media file may then be downloaded to the user system 14 from the archiving server 20 (step 726).

Steps 722-726 may be particularly beneficial when the e-commerce service 30 enables purchasing of a CD or DVD rather than downloadable media files. Thus, if a music CD is purchased, the user would traditionally be required to "rip" the songs from the CD in order to add the songs to his or her media collection at the user system 14. In this case, steps 722-726 provide a process by which the user is no longer required to "rip" the songs from the CD. More specifically, the songs from the purchased CD are added to the archive of the user's media collection and then provided to the user system 14. As a result, the archive of the user's media collection and the user's media collection stored at the user system 14 are automatically updated to include the songs from the purchased CD. Likewise, content from a purchased DVD may automatically be added to the archive of the user's media collection and downloaded to the user system 14, 16.

Steps 722-726 may also be particularly beneficial for downloadable media files. More specifically, the operators of the e-commerce service 30 may have a business arrangement with the operators of the archiving server 20 to provide delivery of purchased media files. Thus, when the user purchases media files in step 720, the delivery of the media files may be effected by the archiving server 20 upon notification of the purchase from the e-commerce service 30. As a result, the e-commerce service 30 is not required to store media files for delivery to its customers. In addition, if a customer is a user registered with the archiving server 20, the archive of the user's media collection is automatically updated when media files are purchased from the e-commerce service 30.

In order to prevent "spoofing" of the archiving server 20 to indirectly obtain information about the user of the user system 14, the archiving server 20 may limit the number of recommendations that may be included in the list of recommended media. In addition or alternatively, the archiving server 20 may limit the number of lists from the e-commerce service 30 for the user within a predetermined period of time or limit the number of lists from the e-commerce service 30 for the user to an absolute number. "Spoofing" of the archiving server 20 may occur when a source, such as the e-commerce service 30, repeatedly sends lists of recommended media to the archiving server 20 or sends very large lists of recommended media to the archiving server 20 and then attempts to indirectly obtain information about the user by analyzing the refined lists returned by the archiving server 20.

Figure 9:
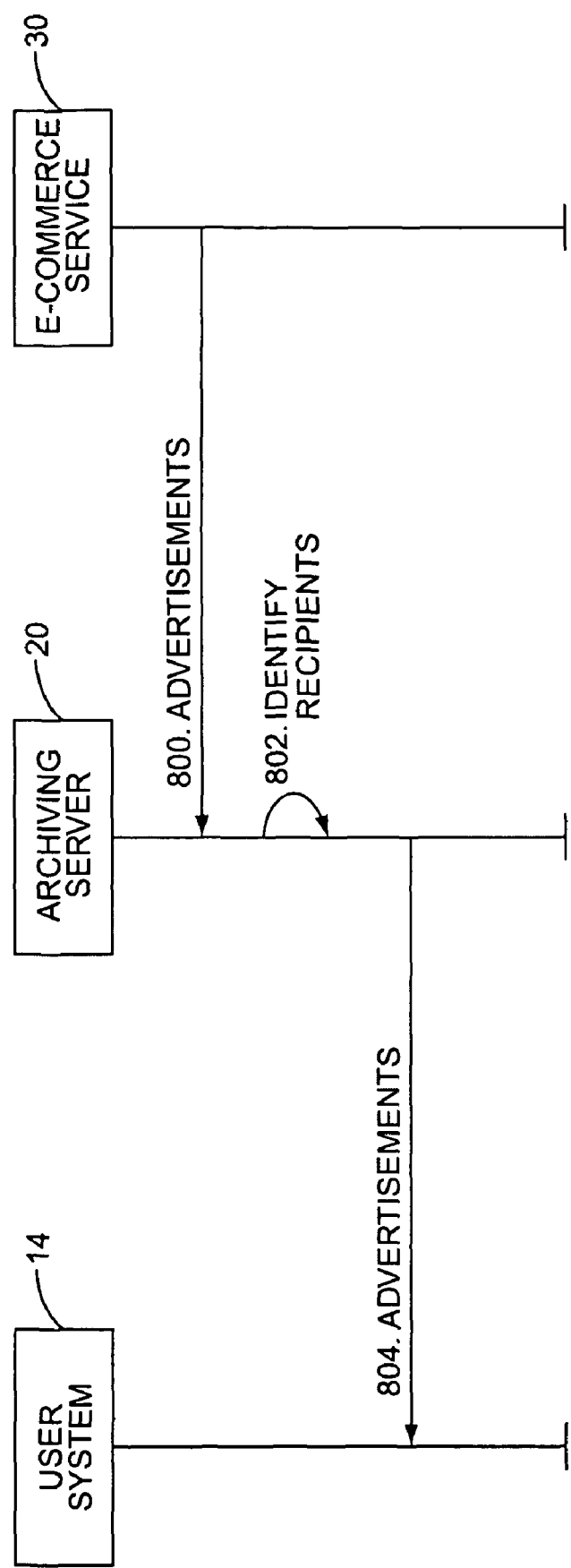
FIG. 9 illustrates the operation of the system of FIG. 1 to provide targeted advertisements to the users of the system according to one embodiment of the present invention.

The system 10 of FIG. 1 may also be used to provide targeted advertisements to the users of the user systems 14, 16 based on the archives of the media collections of the users. As illustrated in FIG. 9, the e-commerce service 30, or any other advertiser, may provide advertisements to the archiving server 20 (step 800). Each of the advertisements is associated with criteria for identifying a target group for the advertisement based on the archives of the media collections of the users of the user systems 14, 16. As discussed above, each archive may include a user profile of the owner of the media collection including demographic information and user preferences, archival information identifying the media files in the user's media collection, and the play history of the user. Thus, the criteria may include information identifying the target group based on demographic information, user preferences, archival information, play history, or any combination thereof. For example, the criteria may include information identifying a target age group, a target group based on marital status or sex, or the like. In addition or alternatively, the criteria may include information identifying one or more desired genres, artists, albums, songs, or any combination thereof such that users having songs from the desired genres, artists, albums, songs, or combination thereof are identified by the archiving server 20 as the target group. Still further, the criteria may additionally or alternatively include information identifying one or more desired genres, artists, albums, songs, or any combination thereof and a range of dates such that users having played songs from the desired genres, artists, albums, songs, or combination thereof within the desired range of dates are identified by the archiving server 20 as the target group.

Once the advertisements are received, the archiving server 20 identifies recipients, or the target group of users, for each of the advertisements based on the criteria for the advertisements and archives of the media collections of the users (step 802). Then, for each of the advertisements, the archiving server 20 provides the advertisement to the identified recipients via, for example, email (step 804). Alternatively, only the criteria for each advertisement may be provided to the archiving server 20, and the archiving server 20 may provide the list of recipients including, for example, the email addresses of the recipients for each advertisement to the e-commerce service 30. The e-commerce service 30, rather than the archiving server 20, may then provide the advertisements to the recipients identified by the archiving server 20.

The archiving server 20 may track the number of advertisements sent to each user over time in order to optimize the number of advertisements sent to each user and to ensure that the advertisements are evenly distributed among the users. By tracking the number of advertisements sent to each user over time, the archiving server 20 may ensure that users are not sent more than a set limit of advertisements over a defined period of time. For example, the archiving server 20 may limit the number of advertisements sent to a particular user to one per day or ten per week unless otherwise specified by the user.

The advertising process of FIG. 9 may enable the archiving server 20 to be funded, at least in part, by advertisers, thereby reducing the cost of the archiving service to the users. For example, during registration, the users may chose to receive free or reduced cost archiving of their media collections if they agree to receiving advertisements by, for example, email.

Figure 10:
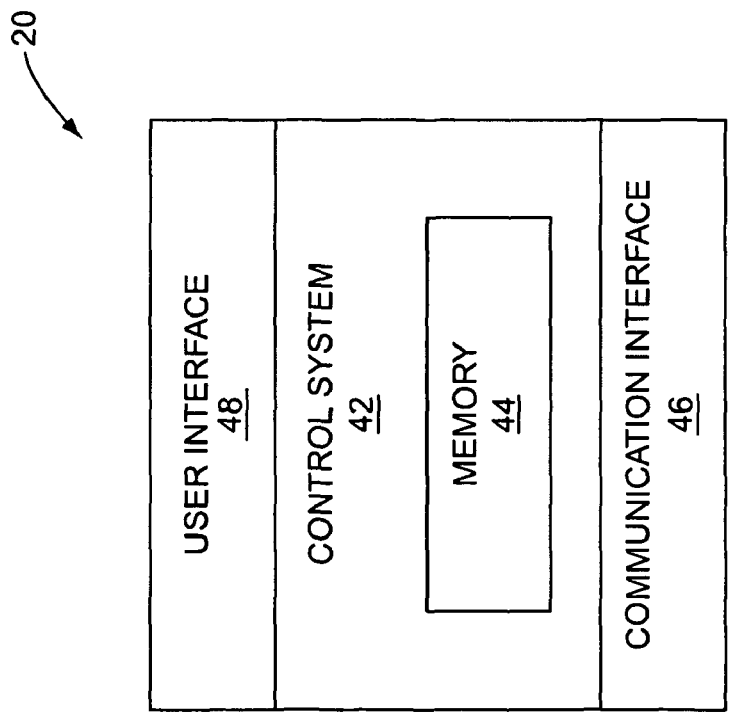
FIG. 10 is a block diagram of the archiving server of FIG. 1 according to one embodiment of the present invention.

FIG. 10 is a block diagram of an exemplary embodiment of the archiving server 20 according to one embodiment of the present invention. In general, the archiving server 20 includes a control system 42 having associated memory 44. The memory 44 includes software instructing the archiving server 20 to operate according to the present invention. In addition, the archiving server 20 includes a communication interface 46 communicatively coupling the archiving server 20 to the network 18 (FIG. 1). The archiving server 20 may also include a user interface 48 including components such as, but not limited to, a display, keyboard, and the like.

Figure 11:
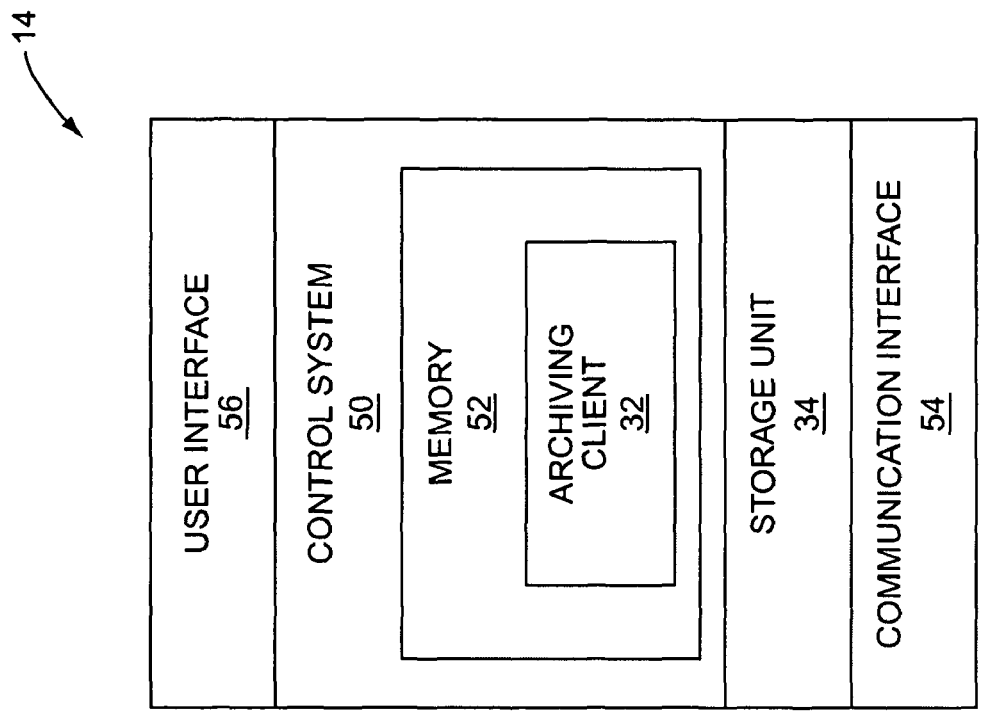
FIG. 11 is a block diagram of the user system of FIG. 1 according to one embodiment of the present invention.

FIG. 11 is a block diagram of an exemplary embodiment of the user system 14 according to one embodiment of the present invention. This discussion is equally applicable to the user system 16. In general, in this embodiment, the user system 14 includes a control system 50 having associated memory 52. In this embodiment, the archiving client 32 is implemented in software and is stored in the memory 52. The user system 14 also includes the storage unit 34, which may be, for example, a hard-disc drive. In addition, the user system 14 includes a communication interface 54 communicatively coupling the user system 14 to the network 18 (FIG. 1). The user system 14 may also include a user interface 56 including components such as, but not limited to, a display, speakers, one or more input devices, and the like.

The present invention provides substantial opportunity for variation without departing from the spirit or scope of the present invention. For example, while the discussion herein has focused on the archiving system 12, the present invention may also be implemented on the user system 14. More specifically, the e-commerce service 30 may alternatively communicate with the user system 14 to have a list of recommended media refined by the user system 14 based on the media collection stored on the user system 14. The refined list may be directly presented to the user via the web browser 36 or via a custom application. The refined list may alternatively be returned to the e-commerce service 30 and then presented to the user, as described above.

Those skilled in the art will recognize improvements and modifications to the preferred embodiments of the present invention. All such improvements and modifications are considered within the scope of the concepts disclosed herein and the claims that follow.

What is claimed is:

1. A system comprising:
   a communication interface communicatively coupling the system to a third-party server hosting an e-commerce service via a network; and
   a control system associated with the communication interface and adapted to:
      store information identifying media files in a user's media collection in an associated storage unit;
      receive a list of recommended media for the user from the e-commerce service;
      update the information identifying media files in the user's media collection to include media purchased by the user from the e-commerce service, wherein updating the information includes:
         generating the media based on a corresponding reference media file and a desired encoding algorithm; and
         providing the media generated based on the corresponding reference media file and the desired encoding algorithm to a user system associated with the user's media collection; and
      refine the list of recommended media based on the information identifying the media files in the user's media collection.

2. The system of claim 1 wherein the e-commerce service comprises a recommendation engine operating to generate the list of recommended media while the user is interacting with the e-commerce service.

3. The system of claim 1 wherein the list of recommended media identifies a plurality of media files and in order to refine the list of recommended media, the control system is further adapted to:
   identify at least one of the plurality of media files in the list of recommended media as a media file within the user's media collection; and
   mark the at least one of the plurality of media files in the list of recommended media as a media file owned by the user, thereby refining the list of recommended media.

4. The system of claim 1 wherein the list of recommended media identifies a recommended album and in order to refine the list of recommended media, the control system is further adapted to:
   identify at least one song in the user's media collection from the recommended album; and
   refine the list of recommended media to identify the at least one song from the recommended album as a song owned by the user.

5. The system of claim 1 wherein the list of recommended media identifies a plurality of albums and in order to refine the list of recommended media, the control system is further adapted to:
   identify at least one of the plurality of albums in the list of recommended media as an album within the user's media collection; and
   mark the at least one of the plurality of albums in the list of recommended media as an album owned by the user, thereby refining the list of recommended media.

6. The system of claim 1 wherein in order to refine the list of recommended media, the control system is further adapted to prioritize the list of recommended media based on the user's media collection.

7. The system of claim 1 wherein in order to refine the list of recommended media, the control system is further adapted to:
   identify a preferred genre based on the user's media collection; and
   prioritize the list of recommended media based on the preferred genre.

8. The system of claim 7 wherein in order to prioritize the list of recommended media, the control system is further adapted to:
   assign a higher priority to media from the list of recommended media associated with the preferred genre; and assign a lower priority to other media from the list of recommended media associated with genres other than the preferred genre.

9. The system of claim 1 wherein in order to refine the list of recommended media, the control system is further adapted to:
identify a preferred music artist based on the user's media collection; and
prioritize the list of recommended media based on the preferred music artist.

10. The system of claim 9 wherein in order to prioritize the list of recommended media, the control system is further adapted to:
assign a higher priority to media from the list of recommended media associated with the preferred music artist; and
assign a lower priority to other media from the list of recommended media associated with music artists other than the preferred music artist.

11. The system of claim 1 wherein the communication interface is further adapted to communicatively couple the system to a user system associated with the user, and the control system is further adapted to:
receive a play history from the user system identifying media files played by the user and a date and time at which each of the media files was played; and
prioritize the list of recommended media based on the play history to further refine the list of recommended media.

12. The system of claim 1 wherein the control system is further adapted to:
store a user profile for the user; and
prioritize the list of recommended media based on the user profile to further refine the list of recommended media.

13. The system of claim 1 wherein the control system is further adapted to:
store user preferences for the user; and
prioritize the list of recommended media based on the user preferences to further refine the list of recommended media.

14. The system of claim 1 wherein the control system is further adapted to:
receive a plurality of lists of recommended media for the user including the list of recommended media from the e-commerce service; and
limit a number of the plurality of lists refined based on the user's media collection.

15. The system of claim 1 wherein the control system is further adapted to:
receive a plurality of lists of recommended media for the user including the list of recommended media from the e-commerce service; and
limit a number of the plurality of lists refined based on the user's media collection within a predetermined amount of time.

16. The system of claim 1 wherein the list of recommended media identifies a plurality of media files, and the control system is further adapted to limit a number of the plurality of media files in the list of recommended media to a predetermined number of media files.

17. The system of claim 1 wherein the list of recommended media identifies a plurality of albums, and the control system is further adapted to limit a number of the plurality of albums in the list of recommended media to a predetermined number of albums.

18. The system of claim 1 wherein the information identifying the media files in the user's media collection is an archive of the user's media collection.

19. The system of claim 18 wherein the communication interface is further adapted to communicatively couple the system to a user system associated with the user, and the control system is further adapted to:
receive information regarding media content and an encoding algorithm for each of a plurality of media files in the user's media collection;
identify the media content and the encoding algorithm for each of the plurality of media files based on the information regarding the media content and the encoding algorithm for each of the plurality of media files; and
generate an archive record operating as an archive of the user's media collection, the archive record comprising information identifying the media content and information identifying the encoding algorithm for each of the plurality of media files rather than the plurality of media files.

20. The system of claim 19 wherein the control system is further adapted to:
receive a notification identifying media purchased from the e-commerce service; and
update the archive of the user's media collection to include the media purchased from the e-commerce service in response to the notification.

21. The system of claim 1 wherein the control system is further adapted to:
store information identifying media files in a media collection of each of a plurality of users including the information identifying the media files in the user's media collection;
receive advertisements and criteria for identifying a target group of the plurality of users for each of the advertisements from an advertiser via the network;
identify the target group of the plurality of users for each of the advertisements based on the criteria for each of the advertisements and the information identifying the media files in the media collection of each of the plurality of users; and
provide the advertisements to the target groups of the plurality of users.

22. The system of claim 1 wherein the control system is further adapted to:
store information identifying media files in a media collection of each of a plurality of users including the information identifying the media files in the user's media collection;
receive criteria for identifying a target group of the plurality of users for each of a plurality of advertisements from an advertiser via the network;
identify the target group of the plurality of users for each of the plurality of advertisements based on the criteria and the information identifying the media files in the media collection of each of the plurality of users; and
provide contact information to the advertiser for each user in the target group of the plurality of users for each of the plurality of advertisements;
wherein the advertiser provides the plurality of advertisements to the target groups of the plurality of users based on the contact information.

23. The system of claim 1 wherein the control system is further adapted to return the refined list of recommended media to the e-commerce service for delivery to the user.

24. A method for operating a central system comprising:
storing, at the central system, information identifying media files in a user's media collection;
receiving, at the central system, a list of recommended media for the user from an e-commerce service;

updating, at the central system, the information identifying media files in the user's media collection to include media purchased by the user from the e-commerce service, wherein updating the information includes:
- generating the media based on a corresponding reference media file and a desired encoding algorithm; and
- providing the media generated based on the corresponding reference media file and the desired encoding algorithm to a user system associated with the user's media collection; and refining the list of recommended media, at the central system, based on the information identifying the media files in the user's media collection.

25. The method of claim 24 further comprising returning the refined list of recommended media to the e-commerce service for delivery to the user.

26. A system comprising:
- a communication interface communicatively coupling the system to a third-party server hosting an e-commerce service via a network; and
- a control system associated with the communication interface and adapted to:
  - store an archive of a user's media collection in an associated storage unit;
  - receive a list of recommended media for the user from the e-commerce service;
  - refine the list of recommended media based on information identifying media files in the user's media collection;
  - receive information regarding media content and an encoding algorithm for each of a plurality of media files in the user's media collection;
  - identify the media content and the encoding algorithm for each of the plurality of media files based on the information regarding the media content and the encoding algorithm for each of the plurality of media files;
  - generate an archive record operating as an archive of the user's media collection, the archive record comprising the information identifying the media content and the information identifying the encoding algorithm for each of the plurality of media files rather than all of the plurality of media files;
  - receive a notification identifying the media purchased from the e-commerce service;
  - update the archive of the user's media collection to include the media purchased from the e-commerce service;
  - provide the media purchased from the e-commerce service to a user system associated with the user's media collection;
  - generate the media based on a corresponding reference media file and a desired encoding algorithm; and
  - provide the media generated based on the corresponding reference media file and the desired encoding algorithm to a user system associated with the user.

* * * * *